(12) United States Patent
Kashiwagi et al.

(10) Patent No.: US 10,333,300 B2
(45) Date of Patent: Jun. 25, 2019

(54) POWER DISTRIBUTION MANAGEMENT APPARATUS, POWER DISTRIBUTION MANAGEMENT METHOD, AND RECORDING MEDIUM

(71) Applicant: FUJITSU LIMITED, Kawasaki-shi, Kanagawa (JP)

(72) Inventors: Tetsuya Kashiwagi, Fukuoka (JP); Yuichi Matsufuji, Fukuoka (JP); Sari Kawashima, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 598 days.

(21) Appl. No.: 14/668,407

(22) Filed: Mar. 25, 2015

(65) Prior Publication Data
US 2015/0200542 A1    Jul. 16, 2015

Related U.S. Application Data

(63) Continuation of application No. PCT/JP2012/075435, filed on Oct. 1, 2012.

(51) Int. Cl.
*H02J 3/00* (2006.01)
*H02J 13/00* (2006.01)
*G05B 15/02* (2006.01)

(52) U.S. Cl.
CPC ............ *H02J 3/00* (2013.01); *G05B 15/02* (2013.01); *H02J 13/0006* (2013.01)

(58) Field of Classification Search
CPC ........ H02J 3/00; H02J 13/0006; G05B 15/02; Y04S 20/221; Y02B 70/3216
(Continued)

(56) References Cited

U.S. PATENT DOCUMENTS

2006/0238364 A1* 10/2006 Keefe ................ G05B 23/0267
340/646
2009/0055527 A1* 2/2009 Akiyama .......... G06F 17/30958
709/224
(Continued)

FOREIGN PATENT DOCUMENTS

JP          7-241048 A       9/1995
JP          H09-070141       3/1997
(Continued)

OTHER PUBLICATIONS

JP2009284632 Translation, Dec. 2009.*
(Continued)

*Primary Examiner* — Thomas C Lee
*Assistant Examiner* — Alan Chu
(74) *Attorney, Agent, or Firm* — Fujitsu Patent Center

(57) ABSTRACT

A power distribution management apparatus includes an electrical connection storage unit, a search unit, and an output unit. The electrical connection storage unit is configured to store electrical connection information in which a combination of a plurality of junctions that describes which a plurality of facilities of a power distribution system are electrically connected to each other and a facility determined based on the combination are associated. The search unit is configured to search a facility corresponding to the combination while investigating an uninvestigated junction among the plurality of junctions contained in the combination starting from a predetermined junction with reference to the electrical connection information stored in the electrical connection storage unit. The output unit is configured to output facility information obtained from the combination where the investigation is performed and a result of the search after the investigation and the search are performed.

10 Claims, 17 Drawing Sheets

(58) Field of Classification Search
USPC .......................................................... 700/286
See application file for complete search history.

(56) References Cited

U.S. PATENT DOCUMENTS

| | | | | |
|---|---|---|---|---|
| 2009/0187284 | A1* | 7/2009 | Kreiss | ................... G06Q 50/06 700/291 |
| 2013/0024149 | A1* | 1/2013 | Nayar | ....................... H02J 3/26 702/72 |
| 2013/0176021 | A1* | 7/2013 | Udagawa | ........... G01R 33/0064 324/244 |

FOREIGN PATENT DOCUMENTS

| JP | 10-70840 A | 3/1998 |
|---|---|---|
| JP | 11-89089 A | 3/1999 |
| JP | 2002-152932 | 5/2002 |
| JP | 2009-284632 A | 12/2009 |
| JP | 2010-183775 A | 8/2010 |
| WO | 2012015101 | 2/2012 |

OTHER PUBLICATIONS

International Search Report, mailed in connection with PCT/JP2012/075435 dated Dec. 4, 2012 (11 pages).

Extended European Search Report mailed by EPO and corresponding to of EP Patent Application 12886058.2 dated Oct. 1, 2015 (7 pages).

Japanese Office Action dated Jan. 4, 2017 for corresponding Japanese Patent Application No. 2014-539501, with Partial English Translation, 8 pages.

Japanese Office Action dated Jun. 14, 2016 for corresponding Japanese Patent Application No. 2014-539501, with Partial English Translation, 5 pages.

* cited by examiner

FIG.4

| POSITION ID | POSITION TYPE | LONGITUDE | LATITUDE |
|---|---|---|---|
| SS0001 | SS | 502723016 | 128084866 |
| PO0001 | POLE | 502723021 | 128084176 |
| PO0002 | POLE | 502723031 | 128083227 |
| PO0003 | POLE | 502724066 | 128083262 |
| PO0004 | POLE | 502725091 | 128083296 |
| PO0005 | POLE | 502726033 | 128083331 |
| PO0006 | POLE | 502726840 | 128083382 |
| PO0007 | POLE | 502727844 | 128083430 |
| PO0008 | POLE | 502728620 | 128083503 |
| LL0001 | LOADL | 502728677 | 128083736 |
| PO0009 | POLE | 502729231 | 128083641 |
| PO0010 | POLE | 502729304 | 128084383 |
| PO0011 | POLE | 502729179 | 128084814 |
| LL0002 | LOADL | 502729402 | 128085012 |
| PO0012 | POLE | 502728879 | 128085361 |
| PO0013 | POLE | 502728620 | 128085900 |
| LL0003 | LOADL | 502729298 | 128086064 |
| LL0004 | LOADL | 502729174 | 128086288 |
| LL0005 | LOADL | 502729133 | 128085547 |
| PO0014 | POLE | 502725019 | 128082520 |
| LL0006 | LOADL | 502724661 | 128082339 |
| PO0015 | POLE | 502725112 | 128081757 |
| PO0016 | POLE | 502725122 | 128081244 |
| LL0007 | LOADL | 502724765 | 128081321 |
| LL0008 | LOADL | 502724744 | 128081718 |

| FACILITY ID | POSI-TION ID | TYPE | ATTRIBUTE INFORMATION |
|---|---|---|---|
| PO0001 P1 | PO0001 | POLE | ... |
| PO0001 01 | PO0001 | SW | ... |
| PO0002 P1 | PO0002 | POLE | ... |
| PO0003 P1 | PO0003 | POLE | ... |
| PO0004 P1 | PO0004 | POLE | ... |
| PO0004 01 | PO0004 | SW | ... |
| PO0005 P1 | PO0005 | POLE | ... |
| PO0006 P1 | PO0006 | POLE | ... |
| PO0007 P1 | PO0007 | POLE | ... |
| PO0007 01 | PO0007 | BANK | RESISTANCE (36800 Ω), REACTANCE (31300 Ω), VOLTAGE RATIO 1 |
| PO0008 P1 | PO0008 | POLE | ... |
| LL0001 01 | LL0001 | LOADL | ... |
| PO0009 P1 | PO0009 | POLE | ... |
| PO0009 01 | PO0009 | SW | ... |
| PO0010 P1 | PO0010 | POLE | ... |
| PO0011 P1 | PO0011 | POLE | ... |
| LL0002 01 | LL0002 | LOADL | ... |
| PO0012 P1 | PO0012 | POLE | ... |
| PO0012 01 | PO0012 | BANK | RESISTANCE (36800 Ω), REACTANCE (31300 Ω), VOLTAGE RATIO 2 |
| PO0013 P1 | PO0013 | POLE | ... |
| LL0003 01 | LL0003 | LOADL | ... |
| LL0004 01 | LL0004 | LOADL | ... |
| LL0005 01 | LL0005 | LOADL | ... |
| PO0014 P1 | PO0014 | POLE | ... |
| LL0006 01 | LL0006 | LOADL | ... |
| PO0015 P1 | PO0015 | POLE | ... |
| PO0015 01 | PO0015 | BANK | RESISTANCE (36800 Ω), REACTANCE (31300 Ω), VOLTAGE RATIO 3 |
| PO0016 P1 | PO0016 | POLE | ... |
| LL0007 01 | LL0007 | LOADL | ... |
| LL0008 01 | LL0008 | LOADL | ... |

FIG.6

| FACILITY ID | POSITION ID₁ | POSITION ID₂ | TYPE | ATTRIBUTE INFORMATION | | |
|---|---|---|---|---|---|---|
| | | | | SPAN SIZE | RESISTANCE (R) | REACTANCE (X) |
| SP0001 | SS0001 | PO0001 | 3H | 21 | 220 | 150 |
| SP0002 | PO0001 | PO0002 | 3H | 29 | 220 | 150 |
| SP0003 | PO0002 | PO0003 | 3H | 32 | 220 | 150 |
| SP0004 | PO0003 | PO0004 | 3H | 32 | 220 | 150 |
| SP0005 | PO0004 | PO0005 | 3H | 29 | 220 | 150 |
| SP0006 | PO0005 | PO0006 | 3H | 25 | 220 | 150 |
| SP0007 | PO0006 | PO0007 | 3H | 31 | 220 | 150 |
| SP0008 | PO0007 | PO0008 | 3H | 24 | 220 | 150 |
| SP0009 | PO0007 | PO0008 | 3L | 24 | 390 | 240 |
| SP0010 | PO0008 | LL0001 | | 7 | 510 | 820 |
| SP0011 | PO0008 | PO0009 | 3H | 19 | 220 | 150 |
| SP0012 | PO0009 | PO0010 | 3H | 23 | 220 | 150 |
| SP0013 | PO0010 | PO0011 | 3H | 14 | 220 | 150 |
| SP0014 | PO0012 | PO0011 | 3L | 19 | 390 | 240 |
| SP0015 | PO0011 | LL0002 | | 9 | 510 | 820 |
| SP0016 | PO0011 | PO0012 | 3H | 19 | 220 | 150 |
| SP0017 | PO0012 | PO0013 | 3L | 18 | 390 | 240 |
| SP0018 | PO0013 | LL0003 | | 22 | 510 | 820 |
| SP0019 | PO0013 | LL0004 | | 21 | 510 | 820 |
| SP0020 | PO0012 | LL0005 | | 10 | 510 | 820 |
| SP0021 | PO0004 | PO0014 | 3H | 24 | 220 | 150 |
| SP0022 | PO0015 | PO0014 | 3L | 24 | 390 | 240 |
| SP0023 | PO0014 | LL0006 | | 12 | 510 | 820 |
| SP0024 | PO0014 | PO0015 | 3H | 24 | 220 | 150 |
| SP0025 | PO0015 | PO0016 | 3L | 16 | 390 | 240 |
| SP0026 | PO0016 | LL0007 | | 11 | 510 | 820 |
| SP0027 | PO0015 | LL0008 | | 11 | 510 | 820 |

FIG.7

| NODE ID | POSITION ID |
|---|---|
| SS0001 N01 | SS0001 |
| PO0001 N01 | PO0001 |
| PO0001 N02 | PO0001 |
| PO0002 N01 | PO0002 |
| PO0003 N01 | PO0003 |
| PO0004 N01 | PO0004 |
| PO0004 N02 | PO0004 |
| PO0005 N01 | PO0005 |
| PO0006 N01 | PO0006 |
| PO0007 N01 | PO0007 |
| PO0007 N02 | PO0007 |
| PO0008 N01 | PO0008 |
| PO0008 N02 | PO0008 |
| LL0001 N01 | LL0001 |
| PO0009 N01 | PO0009 |
| PO0009 N02 | PO0009 |
| PO0010 N01 | PO0010 |
| PO0011 N01 | PO0011 |
| PO0011 N02 | PO0011 |
| LL0002 N01 | LL0002 |
| PO0012 N01 | PO0012 |
| PO0012 N02 | PO0012 |
| PO0013 N01 | PO0013 |
| LL0003 N01 | LL0003 |
| LL0004 N01 | LL0004 |
| LL0005 N01 | LL0005 |
| PO0014 N01 | PO0014 |
| PO0014 N02 | PO0014 |
| LL0006 N01 | LL0006 |
| PO0015 N01 | PO0015 |
| PO0015 N02 | PO0015 |
| PO0016 N01 | PO0016 |
| LL0007 N01 | LL0007 |
| LL0008 N01 | LL0008 |

| BRANCH ID | NODE ID$_1$ | NODE ID$_2$ | FACILITY ID | OPEN/CLOSE SECTION |
|---|---|---|---|---|
| BR0001 | SS0001 N01 | PO0001 N01 | SP0001 | |
| BR0002 | PO0001 N01 | PO0001 N02 | PO0001 01 | 1 |
| BR0003 | PO0001 N02 | PO0002 N01 | SP0002 | |
| BR0004 | PO0002 N01 | PO0003 N01 | SP0003 | |
| BR0005 | PO0003 N01 | PO0004 N01 | SP0004 | |
| BR0006 | PO0004 N01 | PO0004 N02 | PO0004 01 | 1 |
| BR0007 | PO0004 N02 | PO0005 N01 | SP0005 | |
| BR0008 | PO0005 N01 | PO0006 N01 | SP0006 | |
| BR0009 | PO0006 N01 | PO0007 N01 | SP0007 | |
| BR0010 | PO0007 N01 | PO0007 N02 | PO0007 01 | |
| BR0011 | PO0007 N01 | PO0008 N01 | SP0008 | |
| BR0012 | PO0007 N02 | PO0008 N02 | SP0009 | |
| BR0013 | PO0008 N02 | LL0001 N01 | SP0010 | |
| BR0014 | LL0001 N01 | | LL0001 01 | |
| BR0018 | PO0008 N01 | PO0009 N01 | SP0011 | |
| BR0019 | PO0009 N01 | PO0009 N02 | PO0009 01 | 1 |
| BR0020 | PO0009 N02 | PO0010 N01 | SP0012 | |
| BR0021 | PO0010 N01 | PO0011 N01 | SP0013 | |
| BR0022 | PO0012 N02 | PO0011 N02 | SP0014 | |
| BR0023 | PO0011 N02 | LL0002 N01 | SP0015 | |
| BR0024 | LL0002 N01 | | LL0002 01 | |
| BR0028 | PO0011 N01 | PO0012 N01 | SP0016 | |
| BR0029 | PO0012 N01 | PO0012 N02 | PO0012 01 | |
| BR0030 | PO0012 N02 | PO0013 N01 | SP0017 | |
| BR0031 | PO0013 N01 | LL0003 N01 | SP0018 | |
| BR0032 | LL0003 N01 | | LL0003 01 | |
| BR0036 | PO0013 N01 | LL0004 N01 | SP0019 | |
| BR0037 | LL0004 N01 | | LL0004 01 | |
| BR0041 | PO0012 N02 | LL0005 N01 | SP0020 | |
| BR0042 | LL0005 N01 | | LL0005 01 | |
| BR0046 | PO0004 N01 | PO0014 N01 | SP0021 | |
| BR0047 | PO0015 N02 | PO0014 N02 | SP0022 | |
| BR0048 | PO0014 N02 | LL0006 N01 | SP0023 | |
| BR0049 | LL0006 N01 | | LL0006 01 | |
| BR0053 | PO0014 N01 | PO0015 N01 | SP0024 | |
| BR0054 | PO0015 N01 | PO0015 N02 | PO0015 01 | |
| BR0055 | PO0015 N02 | PO0016 N01 | SP0025 | |
| BR0056 | PO0016 N01 | LL0007 N01 | SP0026 | |
| BR0057 | LL0007 N01 | | LL0007 01 | |
| BR0061 | PO0015 N02 | LL0008 N01 | SP0027 | |
| BR0062 | LL0008 N01 | | LL0008 01 | |

FIG.9

| CONNECTION ID | POSI-TION ID | POWER CONSUMPTION (EFFECTIVE) | POWER CONSUMPTION (REACTIVE) |
|---|---|---|---|
| SS0001 N01 | SS0001 | | |
| PO0001 N01 | PO0001 | | |
| PO0001 N02 | PO0001 | | |
| PO0002 N01 | PO0002 | | |
| PO0003 N01 | PO0003 | | |
| PO0004 N01 | PO0004 | | |
| PO0004 N02 | PO0004 | | |
| PO0005 N01 | PO0005 | | |
| PO0006 N01 | PO0006 | | |
| PO0007 N01 | PO0007 | | |
| PO0007 N02 | PO0007 | | |
| PO0008 N01 | PO0008 | | |
| PO0008 N02 | PO0008 | | |
| LL0001 N01 | LL0001 | 200 | 20 |
| PO0009 N01 | PO0009 | | |
| PO0009 N02 | PO0009 | | |
| PO0010 N01 | PO0010 | | |
| PO0011 N01 | PO0011 | | |
| PO0011 N02 | PO0011 | | |
| LL0002 N01 | LL0002 | 220 | 22 |
| PO0012 N01 | PO0012 | | |
| PO0012 N02 | PO0012 | | |
| PO0013 N01 | PO0013 | | |
| LL0003 N01 | LL0003 | 180 | 18 |
| LL0004 N01 | LL0004 | 240 | 24 |
| LL0005 N01 | LL0005 | 210 | 21 |
| PO0014 N01 | PO0014 | | |
| PO0014 N02 | PO0014 | | |
| LL0006 N01 | LL0006 | 300 | 30 |
| PO0015 N01 | PO0015 | | |
| PO0015 N02 | PO0015 | | |
| PO0016 N01 | PO0016 | | |
| LL0007 N01 | LL0007 | 240 | 24 |
| LL0008 N01 | LL0008 | 230 | 23 |

FIG.10

| BRANCH ID | NODE ID₁ | NODE ID₂ | FACILITY ID | OPEN/ CLOSE SECTION | REACTANCE (X) | RESIS- TANCE (R) |
|---|---|---|---|---|---|---|
| BR0001 | SS0001 N01 | PO0001 N01 | SP0001 | | 3150 | 4620 |
| BR0002 | PO0001 N01 | PO0001 N02 | PO0001 01 | 1 | 0 | 0 |
| BR0003 | PO0001 N02 | PO0002 N01 | SP0002 | | 4350 | 6380 |
| BR0004 | PO0002 N01 | PO0003 N01 | SP0003 | | 4800 | 7040 |
| BR0005 | PO0003 N01 | PO0004 N01 | SP0004 | | 4800 | 7040 |
| BR0006 | PO0004 N01 | PO0004 N02 | PO0004 01 | 1 | 0 | 0 |
| BR0007 | PO0004 N02 | PO0005 N01 | SP0005 | | 4350 | 6380 |
| BR0008 | PO0005 N01 | PO0006 N01 | SP0006 | | 3750 | 5500 |
| BR0009 | PO0006 N01 | PO0007 N01 | SP0007 | | 4650 | 6820 |
| BR0010 | PO0007 N01 | PO0007 N02 | PO0007 01 | | 31300 | 36800 |
| BR0011 | PO0007 N01 | PO0008 N01 | SP0008 | | 3600 | 5280 |
| BR0012 | PO0007 N02 | PO0008 N02 | SP0009 | | 5760 | 9360 |
| BR0013 | PO0008 N02 | LL0001 N01 | SP0010 | | 5740 | 3570 |
| BR0014 | LL0001 N01 | | LL0001 01 | | 0 | 0 |
| BR0018 | PO0008 N01 | PO0009 N01 | SP0011 | | 2850 | 4180 |
| BR0019 | PO0009 N01 | PO0009 N02 | PO0009 01 | 1 | 0 | 0 |
| BR0020 | PO0009 N02 | PO0010 N01 | SP0012 | | 3450 | 5060 |
| BR0021 | PO0010 N01 | PO0011 N01 | SP0013 | | 2100 | 3080 |
| BR0022 | PO0012 N02 | PO0011 N02 | SP0014 | | 4560 | 7410 |
| BR0023 | PO0011 N02 | LL0002 N01 | SP0015 | | 7380 | 4590 |
| BR0024 | LL0002 N01 | | LL0002 01 | | 0 | 0 |
| BR0028 | PO0011 N01 | PO0012 N01 | SP0016 | | 2850 | 4180 |
| BR0029 | PO0012 N01 | PO0012 N02 | PO0012 01 | | 31300 | 36800 |
| BR0030 | PO0012 N02 | PO0013 N01 | SP0017 | | 4320 | 7020 |
| BR0031 | PO0013 N01 | LL0003 N01 | SP0018 | | 18040 | 11220 |
| BR0032 | LL0003 N01 | | LL0003 01 | | 0 | 0 |
| BR0036 | PO0013 N01 | LL0004 N01 | SP0019 | | 17220 | 10710 |
| BR0037 | LL0004 N01 | | LL0004 01 | | 0 | 0 |
| BR0041 | PO0012 N02 | LL0005 N01 | SP0020 | | 8200 | 5100 |
| BR0042 | LL0005 N01 | | LL0005 01 | | 0 | 0 |
| BR0046 | PO0004 N01 | PO0014 N01 | SP0021 | | 3600 | 5280 |
| BR0047 | PO0015 N02 | PO0014 N02 | SP0022 | | 5760 | 9360 |
| BR0048 | PO0014 N02 | LL0006 N01 | SP0023 | | 9840 | 6120 |
| BR0049 | LL0006 N01 | | LL0006 01 | | 0 | 0 |
| BR0053 | PO0014 N01 | PO0015 N01 | SP0024 | | 3600 | 5280 |
| BR0054 | PO0015 N01 | PO0015 N02 | PO0015 01 | | 31300 | 36800 |
| BR0055 | PO0015 N02 | PO0016 N01 | SP0025 | | 3840 | 6240 |
| BR0056 | PO0016 N01 | LL0007 N01 | SP0026 | | 9020 | 5610 |
| BR0057 | LL0007 N01 | | LL0007 01 | | 0 | 0 |
| BR0061 | PO0015 N02 | LL0008 N01 | SP0027 | | 9020 | 5610 |
| BR0062 | LL0008 N01 | | LL0008 01 | | 0 | 0 |

POWER DISTRIBUTION MANAGEMENT APPARATUS, POWER DISTRIBUTION MANAGEMENT METHOD, AND RECORDING MEDIUM

CROSS-REFERENCE TO RELATED APPLICATION

This application is a continuation of International Application No. PCT/JP2012/075435, filed on Oct. 1, 2012 and designating the U.S., the entire contents of which are incorporated herein by reference.

FIELD

The present invention relates to a power distribution management apparatus, and a power distribution management method.

BACKGROUND

A power distribution system has been known in which power sent from a power plant is converted in a power substation and supplied to a load facility of a customer such as a house or a factory. A wire connecting the power substation of an electric power provider and the load facility of the customer includes a high-voltage wire which distributes power equal to or more than a predetermined voltage and a low-voltage wire which distributes power converted by a pole transformer or the like.

Standard voltages and allowable ranges to allow a deviation from the standard voltages are defined for the high-voltage wire and the low-voltage wire. For this reason, a voltage drop is calculated by dividing the power distribution system from the power substation to the load facility into a high-voltage system containing facilities such as the high-voltage wire and a switch and a low-voltage system containing facilities such as a low-voltage wire and a lead-in wire. Then, the voltage of the power-distributed from the power substation is set such that a voltage before and after the voltage drop remains in the allowable ranges of the high-voltage system and the low-voltage system, or the voltage of the power flowing through the power distribution system is adjusted by switching an open/close state of the switch disposed in the high-voltage system.

PATENT DOCUMENT

Patent Literature 1: Japanese Laid-open Patent Publication No. 10-70840

By the way, as a distributed power source such as photovoltaic power generation comes into wide use, the distributed power source is provided in the customer in some cases. In this case, it may occur that a reverse power flows from the distributed power source disposed in the customer to the power distribution system of the electric power provider. Therefore, in a case where the power flows bidirectionally between, the power substation and the load facility, for example, it may be considered that the power at each facility contained in the low-voltage system is significantly changed by the reverse power flow.

However, in the related technology described above, there is a problem in that electrical connection of the power distribution system can be ascertained only in a rough unit of the high-volt age system and the low-voltage system. Therefore, in the related art described above, there is a concern that the abnormal situation is overlooked in a case where the power of the voltage exceeding the allowable range flows in a unit smaller than the high-voltage system and the low-voltage system.

SUMMARY

According to an aspect of an embodiment of the present invention, a power distribution management apparatus includes an electrical connection storage unit, a search unit, and an output unit. The electrical connection storage unit is configured to store electrical connection information in which a combination of a plurality of junctions at which a plurality of facilities of a power distribution system are electrically connected to each other and a facility determined based on the combination are associated. The search unit is configured to search a facility corresponding to the combination while investigating an uninvestigated junction among the plurality of junctions contained in the combination starting from a predetermined junction with reference to the electrical connection information stored in the electrical connection storage unit. The output unit is configured to output facility information obtained from the combination where the investigation is performed and a result of the search after the investigation and the search are performed.

The object and advantages of the embodiment will be realized and attained by means of the elements and combinations particularly pointed out in the claims.

It is to be understood that both the foregoing general description and the following detailed description are exemplary and explanatory and are not restrictive of the embodiment.

BRIEF DESCRIPTION OF DRAWINGS

FIG. 4 is a diagram illustrating an example of a "location" table.

FIG. 5 is a diagram illustrating an example of a "unit" table.

FIG. 6 is a diagram illustrating an example of a "span" table.

FIG. 7 is a diagram illustrating an example of a node table.

FIG. 8 is a diagram illustrating an example of a "branch" table.

FIG. 9 is a diagram illustrating an example of a current node table.

FIG. 10 is a diagram illustrating an example of a current "branch" table.

DESCRIPTION OF EMBODIMENTS

A power distribution management apparatus, a power distribution management method, and a power distribution management program according to the present application will be described with reference to the accompanying drawings. Further, embodiments herein do not limit the disclosed technology. Then, the respective embodiments can be implemented by appropriately combining each other in a scope where the processing contents do not conflict.

First Embodiment

[Configuration of Power Distribution Management Apparatus]

Figure 1:
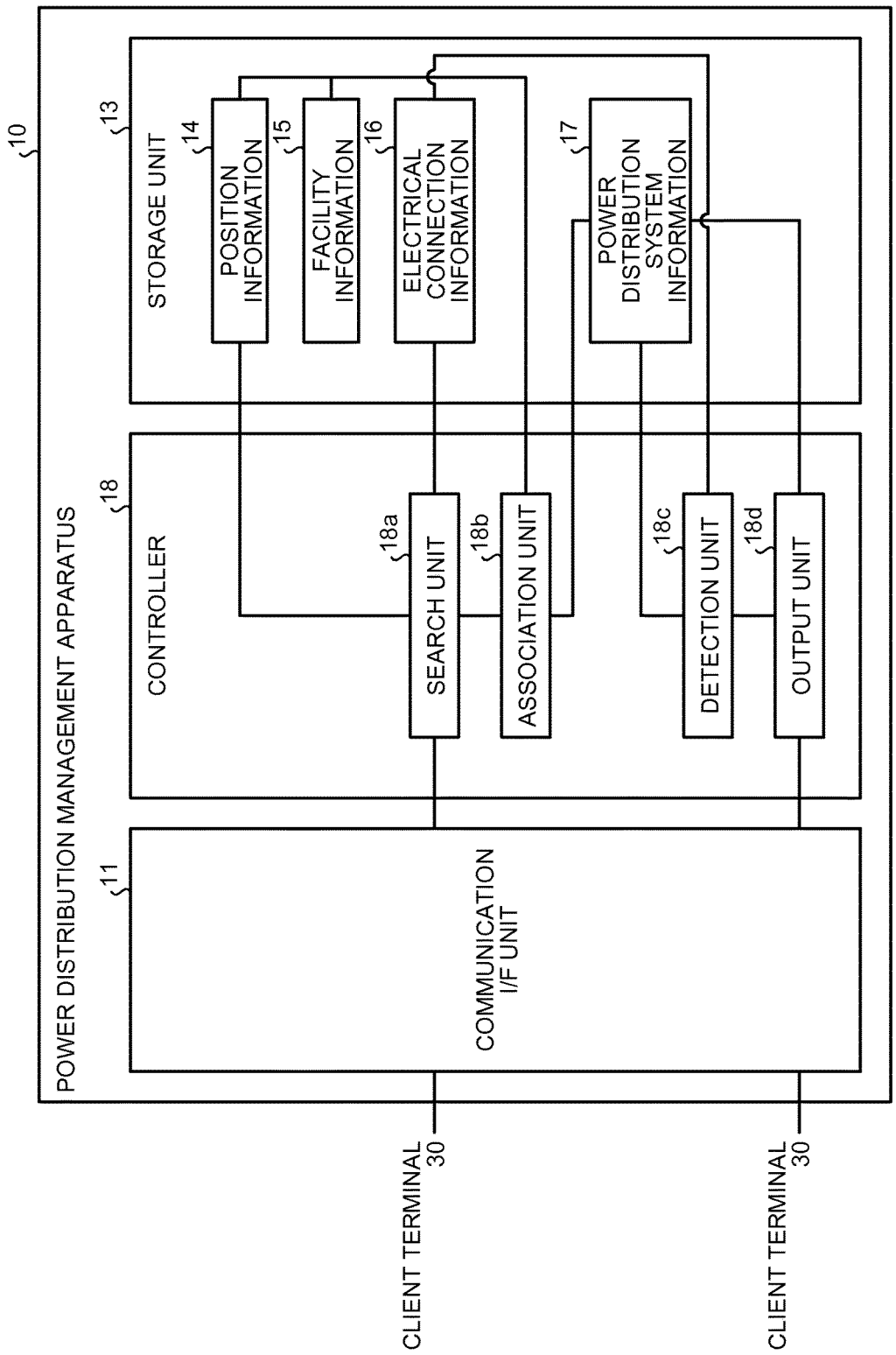
FIG. 1 is a block diagram illustrating a functional configuration of a power distribution management apparatus according to a first embodiment.

FIG. 1 is a block diagram illustrating a functional configuration of a power distribution management apparatus according to a first embodiment. A power distribution management apparatus 10 illustrated in FIG. 1 provides a power distribution management service in which power distribution system information of facilities electrically connected to each other by a power distribution system between a power distribution substation of an electric power provider and a load facility of a customer is generated and output to a client terminal 30.

As an aspect of such power distribution management apparatus 10, a Web server may be mounted to perform the power distribution management process, or an outsourcing cloud may be mounted to provide the power distribution management service. As another aspect, there may be provided a desired computer in which a power distribution management program provided as package software or online software is preinstalled or installed.

As illustrated in FIG. 1, the power distribution management apparatus 10 includes a communication I/F (interface) unit 11, a storage unit 13, and a controller 18. Further, besides the functional units illustrated in FIG. 1, the power distribution management apparatus 10 may include various types of functional units (for example, functional units such as various types of input/output devices or an linage pickup device) included in a well-known computer.

The communication I/F unit 11 is an interface for performing communication control with respect to other apparatuses (for example, the client terminal 30). As an aspect of such communication I/F unit 11, a network interface card such as a LAN (Local Area Network) card can be employed. For example, the communication I/F unit 11 receives a browse request for the power distribution system information from the client terminal 30, or transmits the power distribution system information generated by the controller 18 to the client terminal 30.

The storage unit 13 is a storage device which stores various types of programs such as an OS (Operating System) performed by the controller 18 and the power distribution management program. As an aspect of the storage unit 13, a semiconductor memory element such as flash memory and a storage device such as a hard disk and an optical disk are exemplified. Further, the storage unit 13 is not limited to the above-mentioned storage devices, and may be RAM (Random Access Memory) or ROM (Read Only Memory).

The storage unit 13 stores position information 14, facility information 15, electrical connection information 16, and power distribution system information 17 as an example of data used in the program executed by the controller 18. Further, besides the position information 14, the facility information 15, the electrical connection information 16, and the power distribution system information 17, other electronic data (for example, a history of power consumption in the load facility of the customer) may also be stored.

Herein, in the power distribution management apparatus 10 according to the embodiment, the power distribution system is managed into three divisions as follows: a position management in which a location of the facility is managed, a facility management in which each facility and attribute information of the facility are managed, and an electrical connection management in which the facilities electrically connected to each other are managed.

Among them, in the position management, a position "location" at which a predetermined facility (for example, a power substation, a power pole, a transformer, and the like) is provided among the facilities forming the power distribution system is used as an entity. In addition, in the facility management, a facility "unit" linked at a position of one of the facilities forming the power distribution system and a facility "span" linked at two positions are used as an entity. In addition, in the electrical connection management, a junction "node" at which the facilities are electrically connected to each other and a facility "branch" determined from a plurality of junctions are used as an entity.

Figure 2:
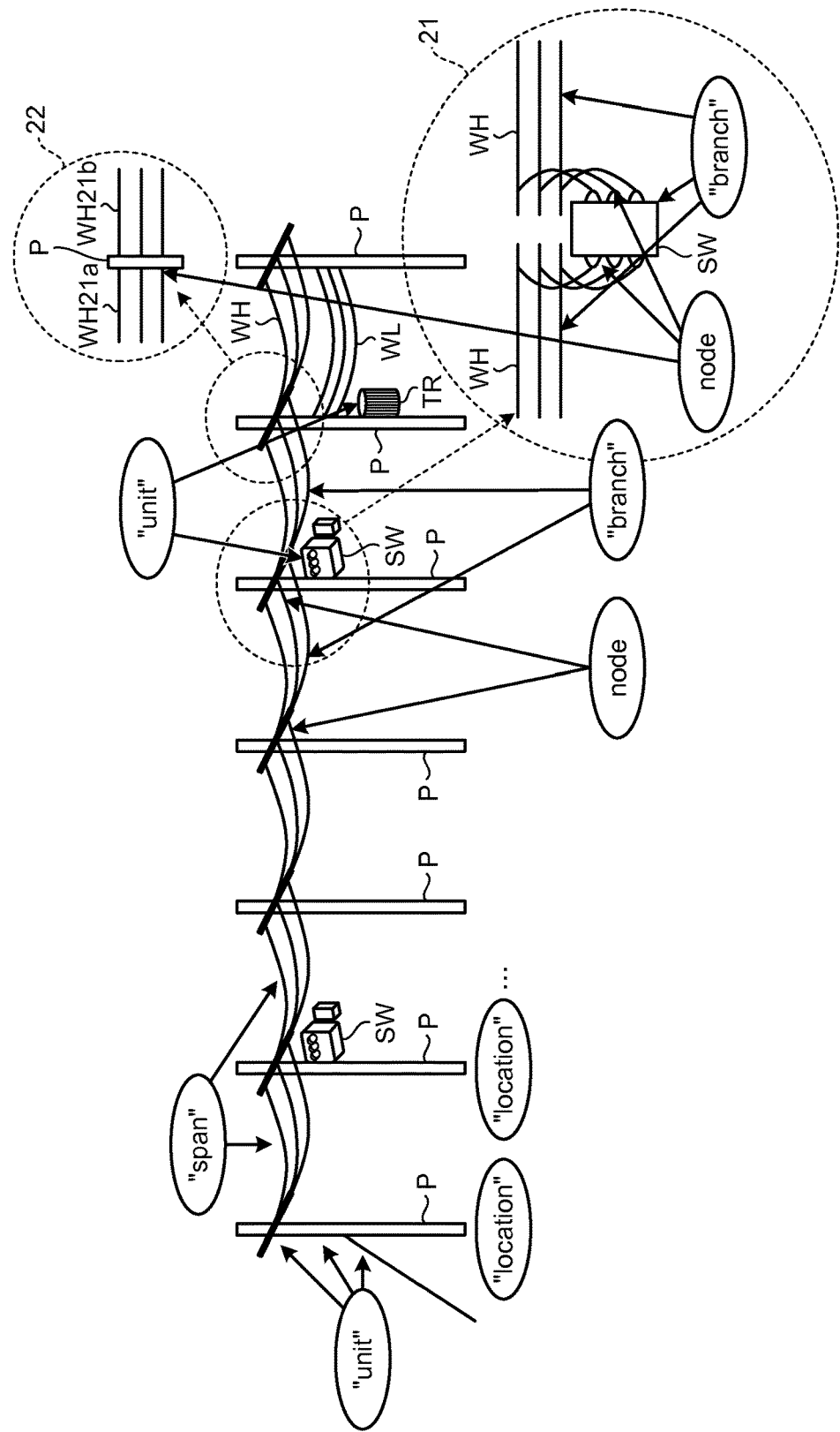
FIG. 2 is a diagram illustrating an aspect of entities.

FIG. 2 is a diagram illustrating an aspect of the entities. As illustrated in FIG. 2, as an example of the "location", for example, there is a position where a non-installation facility (such as a power pole P, and a pole transformer TR) not provided by installation is provided. Besides, a position of a power distribution substation (SS) (not illustrated) or a position of the transformer is also included in a category of the "location".

As an example of a "unit", there are the power pole P, a switch SW, the pole transformer TR, and the like. Besides, the power distribution substation, an SVR (Step Voltage Regulator), and various types of meters (not illustrated) are also included in a category of the "unit".

As an example of the "span", there is a wire (so-called "high-voltage wire") WH which is laid on the high-voltage system between the power distribution substation and the pole transformer TR. As another example of the "span", there is a wire (so-called "lead-in wire") laid on a section from the lead-in wire to the load facility, in addition to a wire (so-called "low-voltage wire") WL laid on a section from the pole transformer TR to the lead-in wire in the low-voltage system between the pole transformer TR and the load facility of the customer. Further, regarding the wire W such as the high-voltage wire WH and the low-voltage wire WL, the number (for example, 3 or 2) of installation units of the power pole P can be collectively handled as one "span".

As an example of the node, there are a junction between the high-voltage wire WH and the switch SW illustrated in an enlarged view 21 in FIG. 2, a junction between the high-voltage wire WH and the pole transformer TR, and a junction between the pole transformer TR and the low-voltage wire WL. Besides, a connection point between the high-voltage wire WH21a and the high-voltage wire WH21b illustrated in an enlarged view 22 of FIG. 2 is also included in a category of the node. Specifically, even in a case where the high-voltage wire WH21a and the high-voltage wire WH21b are installed in the power pole P as a through pole, the high-voltage wire WH21a and the high-voltage wire WH21b are considered to be electrically connected, and a connection point between the high-voltage wires WH is considered as a virtual node.

As an example of the "branch", there are the power pole P, the high-voltage wire WH, the switch SW, the pole transformer TR, the low-voltage wire WL, and the like illustrated in FIG. 2. Besides, the power distribution substation, the lead-in wire, and the load facility (not illustrated) are also included in a category of the "branch". A facility positioned at the end point of the power distribution substation, the load facility, or the like may have one node.

Figure 3:
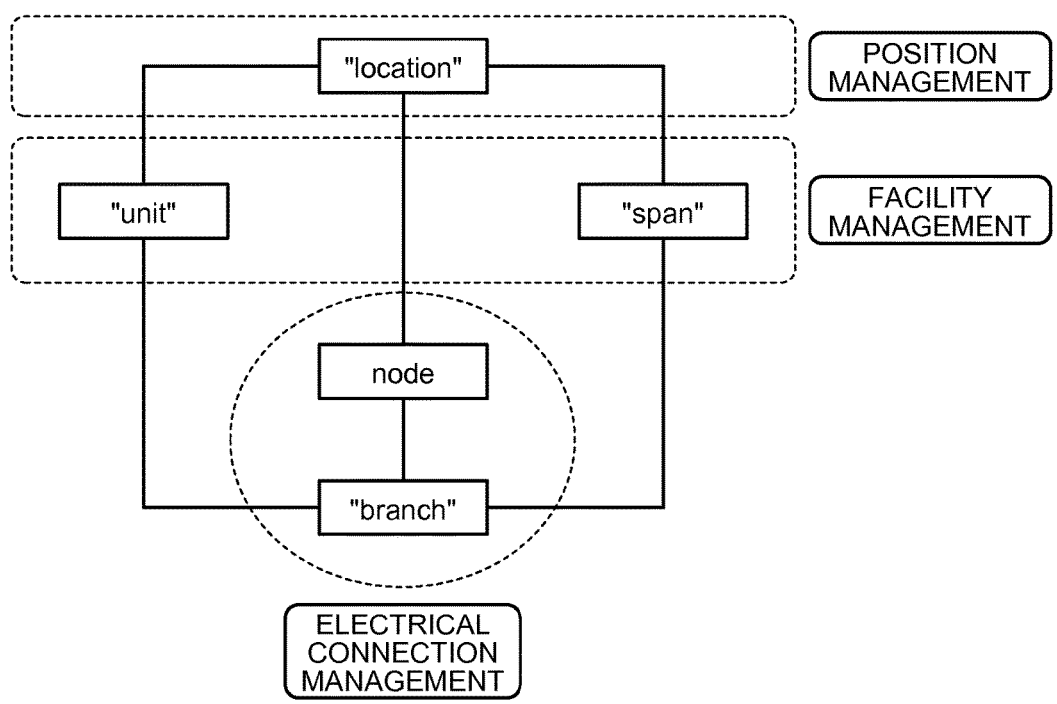
FIG. 3 is a diagram illustrating an example of a mutual relation of the entities.

The entities of the "location", the "unit", the "span", the node, and the "branch" have relevance as illustrated in FIG. 3. FIG. 3 is a diagram illustrating an example of a mutual relation of the entities. As illustrated in FIG. 3, the "location" is used for managing position information, of the "unit" and the "span". In addition, the "branch" is used for managing facility information of the "unit" and the "span". Furthermore, the "location" and the "branch" are related by the node.

Returning to the description of FIG. 1, a "location" table 14a for managing the "location" is included in the position information 14. In addition, a "unit" table 15a for managing the "unit" and a "span" table 15b for managing the "span" are included in the facility information 15. Furthermore, a node table 16a for managing the node and a "branch" table 16b for managing the "branch" are included in the electrical connection information 16. In addition, as to be described below, a current node table 17a and a current "branch" table 17b are included in the power distribution system information 17.

Among them, as an aspect of the "location" table 14a, a table in which items such as a position ID (identifier), a position type, a longitude, and a latitude are associated can be employed. The "position ID" indicates identification information for identifying a position where the facility is provided. In addition, the "position type" indicates information for identifying a type of the position, for example, types of a power distribution substation (SS), a power pole (POLE), and a load facility (LOADL) are included. Further, the information stored in the "location" table 14a, for example, can acquire the position information of a specific facility such as the power substation, the power pole, and the transformer from another existing system (for example, an existing power distribution facility management system for managing the facilities in the power distribution system).

FIG. 4 is a diagram illustrating an example of the "location" table 14a. For example, a "location" of the position ID "SS0001" illustrated in FIG. 4 means that the power distribution substation is positioned at 128°08'48.65" east longitude and at 50°27'23.016" north latitude. In addition, in the subsequent drawings of FIG. 4, various types of IDs are indexed by adding a string identifiable for the various types of facilities such as "SS" indicating the power distribution substation, "PO" indicating the power pole, and "LL" indicating the load facility to the head of a string forming the ID. The indexing of these various types of IDs is not limited to the indexing obtained by adding the string identifiable for the various types of facilities to the head of the string forming the ID, but may be assigned with values which can be uniquely recognized. Further, herein, the longitude and the latitude are exemplified as an item for specifying the position of the facility, but another item (for example, local coordinates, addresses, and the like) may be used.

As an aspect of the "unit" table 15a, a table in which items such as a facility ID, a position ID, a type, and attribute information are associated can be employed. The "facility ID" indicates identification information for identifying the facility, and only the facility ID of the "unit" is stored in the "unit" table 15a. In addition, the "type" indicates a type of the "unit"; for example, the power pole (POLE), the switch (SW), the pole transformer (BANK), and the load facility (LOADL) are included. In addition, the "attribute information" indicates information relating to an attribute of the "unit"; for example, a serial number or performance of the "unit" is included (for example, in a case where the "unit" is a transformer, the capacity of the transformer is registered). The capacity of the transformer can be used to calculate a voltage drop when the electrical connection information of the facility of the current system is extracted. For example, in a case where the "unit" is the transformer, a resistance value, a reactance value, and a voltage ratio of the transformer are registered. Further, the information stored in the "unit" table 15a, for example, is acquired from another existing system (for example, a power-distribution facility management system), and the attribute information of the facility classified into the "unit" among the acquired attribute information of the facility is registered.

FIG. 5 is a diagram illustrating an example of the "unit" table 15a. For example, the facility ID "PO0001P1" illustrated in FIG. 5 means that the "unit" is at a position corresponding to the position ID "PO0001" (that is, 128°08'41.76" east longitude and 50°27'23.021" north latitude illustrated in FIG. 4) and is the power pole. In addition, the facility ID "PO000101" illustrated in FIG. 5 means that the "unit" is at a position corresponding to the position ID "PO0001" (that is, 128°08'41.76" east longitude and 50°27'23.021" north latitude illustrated in FIG. 4) and is the switch. In addition, the facility ID "PO000701" illustrated in FIG. 5 means that the "unit" is at a position corresponding to the position ID "PO0007" (that is, 128°08'34.30" east longitude and 50°27' 27.844" in the example of FIG. 4), and is the pole transformer having a resistance value of "36800Ω", a reactance value of "31300Ω", and a voltage ratio of 1.

As an aspect of the "span" table 15b, a table in which items such as a facility ID, a position $ID_1$, a position $ID_2$, a type, and attribute information are associated can be employed. The "facility ID" herein also indicates the identification information for identifying the facility, and only the facility ID of the "span" is stored in the "span" table 15b. In addition, the "position $ID_1$" indicates the position ID of one of two position IDs linked to the "span", and the "position $ID_2$" indicates the position ID of the other one of two position IDs linked to the "span". In addition, the "type" indicates a type of the "span"; for example, the high-voltage wire, the low-voltage wire, and the lead-in wire are included. In addition, the "attribute information" indicates information relating to the attribute of the "span"; for example, a serial number of the "span", a thickness, a material, a span size, a resistance value per unit (m), and a reactance value per unit (m) are included. The span size, the resistance value per unit, and the reactance value per unit can be used to calculate a voltage drop when the electrical connection information of the facility of the current system is extracted. Further, the information stored in the "span" table 15b, for example, is acquired from another existing system (for example, the power-distribution facility management system), and the attribute information of the facility classified into the "span" among the acquired attribute information of the facility is registered.

FIG. 6 is a diagram illustrating an example of the "span" table 15b. For example, the facility ID "SP0001" illustrated in FIG. 6 means that the "span" is a three-phase high-voltage wire installed in a section at positions corresponding to the position ID$_1$ "SS0001" and the position ID$_2$ "PO0001". The section corresponds to a section from 128°08'48.66" east longitude and 50°27'23.016" north latitude to 128°08'41.76" east longitude and 50°27'23.021" north latitude as described using FIG. 4. Furthermore, the span size, the resistance value, and the reactance value of the facility ID "SP0001" mean "21 m", "220 Ω/m", and "150 Ω/m", respectively. Further, in a case where the type illustrated in FIG. 6 is 3H, it means that the "span" is single-phase three high-voltage wires, and in a case where the type is 3L, it means that the "span" is single-phase three low-voltage wires. In addition, in a case where the type is a blank, it means that the "span" is a lead-in wire.

As an aspect of the node table 16*a*, a table in which items such as a node ID and a position ID are associated can be employed. The "node ID" indicates the identification information for identifying the node. Further, the information stored in the node table 16*a* is acquired from a power distribution automation system which performs a monitoring operation and a remote operation of the switch in another existing system (for example, the power-distribution facility management system and the power distribution system). For example, the node is extracted from the facility information of the low-voltage system acquired from the power-distribution facility management system or the facility information of the high-voltage system acquired from the power distribution automation system, and than the node is registered in the node table 16*a* in association with a predetermined position.

FIG. 7 is a diagram illustrating an example of the node table 16*a*. For example, the node ID "SS0001N01" illustrated in FIG. 7 means that the junction is at a position corresponding to the position ID "SS0001" (that is, 128°08'48.66" east longitude and 50°27'23.016" north latitude illustrated in FIG. 4). In addition, the node IDs "PO0001N01" and "PO0001N02" illustrated in FIG. 7 mean that the junctions are at the same position corresponding to the position ID "PO0001" (that is, 128°08'41.76" east longitude and 50°27'23.021" north latitude illustrated in FIG. 4).

As an aspect of the "branch" table 16*b*, a table in which items such as a branch ID, a node ID$_1$, a node ID$_2$, a facility ID, and an open/close division are associated can be employed. The "branch ID" indicates the identification information for identifying the "branch". In addition, the "node ID$_1$" indicates one node ID of two node IDs of the "branch", and "the node ID$_2$" indicates the other node ID of two node IDs of the "branch". However, the "branch" positioned at the end point of the power distribution substation or the load facility may have any one node ID in the node ID$_1$ and the node ID$_2$. In addition, the "facility ID" herein also indicates the identification information for identifying the facility, and the facility ID of any one of the "unit" and the "span" may be stored in the "branch" table 15*b*. In addition, the "open/close division" indicates the open/close state of the switch. In the open/close division, in a case where the "branch" is a switch, an "open state" or a "close state" of the switch is registered, but in a case where the "branch" is not the switch, a "blank" is registered.

Further, the information stored in the "branch" table 16*b* is acquired from another existing system (for example, the power-distribution facility management system and the power distribution automation system). For example, after the "branch" is extracted out of the facility information of the low-voltage system acquired from the power-distribution facility management system or the facility information of the high-voltage system acquired from the power distribution automation system, the extracted "branch" is registered in the "branch" table 16*b* in association with the node of the "branch".

FIG. 8 is a diagram illustrating an example of the "branch" table 16*b*. For example, the branch ID "BR0001" illustrated in FIG. 8 means that the "branch" is the high-voltage wire of the facility ID "SP0001" defined by the node ID$_1$ "SS0001N01" and the node ID$_2$ "PO0001N01". In addition, the branch ID "BR0002" illustrated in FIG. 8 means that the "branch" is the switch of the facility ID "PO000101" defined by the node ID$_1$ "PO0001N01" and the node ID$_2$ "PO0001N02", and since the open/close division is set to "1", it means that the switch is in the close state. Further, in a case where the open/close division illustrated in FIG. 8 is set to "0", it means that the switch is in the open state, and in a case where the open/close division is set to a blank, it means that the facility is not the switch. The close state of the switch indicates a conductive state, and the open state indicates a nonconductive state.

The controller 18 includes an internal memory for storing programs defining various processes and control data, and executes various processes using these programs and data. As illustrated in FIG. 1, the controller 18 includes a search unit 18*a*, an association unit 18*b*, a detection unit 18*c*, and an output unit 18*d*.

The search unit 18*a* is a processing unit which searches a "branch" corresponding to the subject combination with reference to the electrical connection information 16 while investigating an uninvestigated node among the nodes included in a node combination starting from a predetermined node.

As an aspect, the search unit 18*a* activates the process in a case where a browse request of the power distribution system information is received through the client terminal 30 or in a case where a certain time period elapses after the previous process is executed. First, the search unit 18*a* searches a position ID of which the position type is the power distribution substation "SS" among the position IDs stored in the "location" table 14*a*. Then, the search unit 18*a* registers the position ID of the power distribution substation SS investigated from the "location" table 14*a* in an investigation list stored in an internal memory (not illustrated). Besides the position ID of the power distribution substation SS as an investigation target, an uninvestigated node or an uninvestigated "branch" which is found out at the time of the investigation is registered in the investigation list whenever it is founded out. Further, herein, a case of searching the position ID of the power distribution substation SS from the "location" table 14*a* has been exemplified, but it may be configured to search a node ID starting with "SS" in a string among the node IDs stored in the node table 16*a* or the "branch" table 16*b*.

Subsequently, the search unit 18*a* selects one position ID of the power distribution substation SS registered in the investigation list. Then, the search unit 18*a* searches a node corresponding to the position ID of the power distribution substation SS on which the selection is previously performed among the nodes stored in the node table 16*a*. Thereafter, the search unit 18*a* registers a record of the node searched from the node table 16*a* in the current node table 17*a* stored as the power distribution system information 17 in the storage unit 13. Furthermore, the search unit 18*a* registers the node searched from the node table 16*a* in the investigation list. Further, in a case where the power distribution substation SS includes a plurality of SS banks, even when the search is performed using one position ID, the records of the plurality of nodes are searched.

Then, the search unit 18a selects one node registered in the investigation list. Subsequently, the search unit 18a searches a record of the "branch" having a combination of the node IDs in which the previously-selected node is included (that is, a combination of the node ID$_1$ and the node ID$_2$) among the "branches" stored in the "branch" table 16b. Thereafter, the search unit 18a registers the record of the "branch" searched from the "branch" table 16b to the current "branch" table 17b stored as the power distribution system information 17 in the storage unit 13. Furthermore, the search unit 18a registers the "branch" searched from the "branch" table 16b in the investigation list. At this time, the one registered in the investigation list, for example, may be the branch ID or may be the facility ID.

Subsequently, the search unit 18a selects one "branch" registered in the investigation list. Then, the search unit 18a searches the attribute information corresponding to the facility ID of the "branch" on which the selection is previously performed, from the "span" table 15b. At this time, in a case where the "branch" is a "span", the attribute information can be searched from the "span" table 15b, but in a case where the "branch" is a "unit", it is not possible to search the attribute information. For this reason, in a case where it is not possible to search the attribute information from the "span" table 15b, the search unit 18a searches the attribute information corresponding to the facility ID of the "branch" on which the selection is previously performed from the "unit" table 15a.

Thereafter, in a case where the other node paring with the node used in the investigation among the combination of the nodes is not a blank, the search unit 18a determines whether the subject "branch" is the switch. Then, in a case where the "branch" is a switch, the search unit 18a determines whether the switch is in the close state (that is, whether the open/close division is "1"). At this time, in a case where the switch is in the close state, since the switch is in a powered state (that is, the ON state), the search unit 18a searches the record of the other node from the node table 16a and then registers the searched node in the current node table 17a of the power distribution system information 17. Furthermore, the search unit 18a adds the other node to the investigation list as the uninvestigated node.

Then, the search unit 18a repeatedly performs the processes from the selection of the uninvestigated "branch" to the current process until all the "branches" registered in the investigation list are investigated. Thereafter, when all the "branches" registered in the investigation list are investigated, the search unit 18a repeatedly performs the processes from the selection of the uninvestigated node to the current process until all the nodes registered in the investigation list are investigated. Then, the search unit 18a repeatedly performs the processes from the selection of the position ID of the uninvestigated power distribution substation SS to the current process until all the position IDs of the power distribution substations SS registered in the investigation list are investigated.

Herein, a searching process of the search unit 18a will be specifically described using the respective tables of FIGS. 4 to 8. First, the position ID "SS0001" of which the position type of the non-installation facility is the power distribution substation "SS" is searched among the position IDs stored in the "location" table 14a illustrated in FIG. 4. Then, the position ID "SS0001" of the power distribution substation SS searched from the "location" table 14a is registered in the investigation list. In this case, since only the position ID "SS0001" of the power distribution substation SS is registered in the investigation list, the position ID "SS0001" is selected. Then, the node ID "SS0001N01" corresponding to the position ID "SS0001" of the power distribution substation SS on which the selection is previously performed is searched among the nodes stored in the node table 16a illustrated in FIG. 7. Subsequently, the record of the node ID "SS0001N01" searched from the node table 16a is registered in the current node table 17a. Furthermore, the node ID "SS0001N01" searched from the node table 16a is registered even in the investigation list. In this case, since only the node ID "SS0001N01" is registered in the investigation list, the node ID "SS0001N01" is selected.

Then, the node ID$_1$ "SS0001N01" is searched among the "branches" stored in the "branch" table 16b illustrated in FIG. 8, and the "branch" of the facility ID "SP0001" having the combination of the node ID$_1$ "SS0001N01" and the node ID$_2$ "PO0001N01" is found. Thereafter, the record of the "branch" of the facility ID "SP0001" searched from the "branch" table 16b is registered in the current "branch" table 17b. Furthermore, the facility ID "SP0001" searched from the "branch" table 16b is registered in the investigation list. In this case, since only the facility ID "SP0001" is registered in the investigation list, the facility ID "SP0001" is selected.

Then, the attribute information "span size 21 m, resistance $R_{B1}$, reactance $X_{B1}$", of the "span" corresponding to the facility ID "SP001" on which the selection is previously performed is searched from the "span" table 15b illustrated in FIG. 6. Further, herein, the description has been made about a case where the attribute information of the "span" is searched. However, in a case where the facility ID starts with a string other than "SP", the attribute information is not searched from the "span" table 15b, but the attribute information of the "unit" is searched from the "unit" table 15a illustrated in FIG. 5.

From the attribute information "span size 21 m, resistance 220 Ω/m, reactance 150 Ω/m" thus obtained, a resistance value of 4621 (220×21) Ω and a reactance value of 3150 (150×21) Ω are registered in the current "branch" table 17b in association with the record of the "branch" of the facility ID "SP0001" used in searching the "span" table 15b.

Thereafter, the other node ID "PO0001N01" paring with the node ID "SS0001N01" used in the investigation is set as a value in the combination of the node ID$_1$ "SS0001N01" and the node ID$_2$ "PO0001N01". In this way, since the other node ID is not a blank, it is determined whether the "branch" of the subject facility ID "SP0001" is a switch. Then, in the "branch" of the facility ID "SP0001", a value of the open/close division is a blank, and the "branch" is not the switch. Therefore, the record of the other node ID "PO0001N01" is searched from the node table 16a and then the record of the other node ID "PO0001N01" is registered in the current node table 17a of the power distribution system information 17. Furthermore, the other node ID "PO0001N01" is added to the investigation list as an uninvestigated node.

In this way, at the time when the other node ID "PO0001N01" is registered in the investigation list as an uninvestigated node, the node ID other than the node ID "PO0001N01" is not registered. Therefore, the node ID "PO0001N01" is investigated and then the search is kept on.

Further, herein, the case where the other node ID is not a blank, has been exemplified, but in a case where the other node ID is a blank, the investigation of the uninvestigated "branch" registered in the investigation list is performed. In addition, when the uninvestigated "branch" is not present, the investigation of the uninvestigated node is performed. Then, when the position ID of the uninvestigated power distribution substation SS is not present, the investigation is ended. In addition, herein, the case where the "branch" is not a switch has been exemplified, but in a case where the "branch" is a switch, when the switch is not in the close state, the search of the other node ID and the addition of the other node to the investigation list are not performed. This is because in a case where the switch is in the open state, when the search of the other node ID and the addition of the other node to the investigation list are performed, another power distribution system which is not electrically connected is erroneously registered in the current node table 17*a* or the current "branch" table 17*b*.

Returning to the description of FIG. 1, the association unit 18*b* is a processing unit which associates the facility (obtained from the combination of junctions where the investigation is performed and a result of the search) and the attribute information of a facility obtained as a result of the search among the attribute information contained in the facility information 15. As an aspect, the association unit 18*b* associates the record of the "branch" where the investigation is performed and the attribute information of the "branch" searched from the "span" table 15*b* or the "unit" table 15*a*. For example, the association unit 18*b* registers the attribute information of the "branch" in association with the record of the "branch" used in the search of the "span" table 15*b* or the "unit" table 15*a* among the records stored in the current "branch" table 17*b*. At this time, the association unit 18*b* searches the position ID corresponding to the facility ID of the "branch" from the "unit" table 15*a* or the "span" table 15*b* and then further associates the position ID.

Therefore, as a result of associating the record of the "branch" and the attribute information of the "branch" in the current "branch" table 17*b* after the investigation is ended, it is possible to generate the power distribution system information 17 in which the facilities of the current system electrically connected to each other and the attribute information of the current system are associated with each other.

Herein, the current node table 17*a* and the current "branch" table 17*b* will be described. FIG. 9 is a diagram illustrating an example of the current node table 17*a*. FIG. 10 is a diagram illustrating an example of the current "branch" table 17*b*. In FIGS. 9 and 10, the current node table 17*a* and the current "branch" table 17*b* which are generated by using the respective tables illustrated in FIGS. 4 to 8 are illustrated starting from the node ID "SS0001N01".

As illustrated in FIG. 9, among the records of the current node table 17*a*, the power consumption (as an example of the attribute information) measured by a meter such as a smart meter is registered in the records of the nodes "LL0001N01", "LL0002N01", "LL0003N01", "LL0004N01", "LL0005N01", "LL0006N01", "LL0007N01", and "LL0008N01" which are the junctions between the load facilities of the customers and the facilities of the power distribution system. The power consumption contains "effective power" which is consumed by the load facility and "reactive power" which is not consumed by the load facility. Among them, the reactive power is called delay reactive power. The power consumption (effective) and the power consumption (reactive) are referred in a case where the power of each node is calculated.

As illustrated in FIG. 10, the value of the open/close division registered in the "branch" table 16*b* is registered in a record in which the facility of the "branch" is a switch among the records of the current "branch" table 17*b*. For example, since all the open/close divisions are registered with a value of "1" in the switch of the branch IDs "BR0002", "BR0006", and "BR0019", it means that the switches are in the close state and in the energizing state. In FIG. 10, the switch of which the open/close division is "1" has been exemplified, in a case where the open/close division of the switch is "0", it means that the switch is in the open state and not in the energizing state. In addition, a reactance value X and a resistance value R (as an example of the attribute information) are registered in the respective records of the current "branch" table 17*b*. Among them, in a case where the facility of the "branch" is a "unit" (for example, the switch or the transformer), the reactance value X and the resistance value R registered in the "unit" table 15*a* are registered as the attribute information without any change. On the other hand, in a case where the facility of the "branch" is a "span", a value obtained by multiplying the value of the span size by the reactance value per unit, registered in the "span" table 15*b* is registered as the reactance value X, and a value obtained by multiplying the value of the span size by the resistance value per unit is registered as the resistance value R. The reactance value X and the resistance value R of these "unit" and "span" are referred in a case where a voltage at each node is calculated.

Further, herein, the power consumption (effective), the power consumption (reactive), the resistance value, and the reactance value have been exemplified as a parameter used for calculating the voltage, a connection phase item to which the transformer is connected is added in any one of the current node table 17*a* or the current "branch" table 17*b*, so that the calculation of the voltage can be accurately performed. For example, in a case where the wires are the single-phase three wires, a first transformer connected to the wire on a pole is referred to as "connection phase 1", a second one is referred to as "connection phase 2", and a third one is referred to as "connection phase 3". Further, in a case where the transformer is connected to the first and second wires of the three wires, a value of "A" can be registered, in a case where the second and third wires are connected to the transformer, the value of "B" can be registered, and in a case where the first and third wires are connected to the transformer, a value of "C" can be registered.

The detection unit 18*c* is a processing unit which compares the electrical connection information 16 with the power distribution system information 17 and detects a blackout facility. As an aspect, the detection unit 18*c* compares the record of the "branch" stored in the "branch" table 16*b* and the record of the "branch" stored in the current "branch" table 17*b*. At this time, in a case where the "branch" table 16*b* includes a record of the "branch" not matched with the current "branch" table 17*b*, the detection unit 18*c* detects the facility having the facility ID contained in the record of the subject "branch" as a blackout place. With this configuration, it is possible to automatically detect a facility which stops power transmission not by an accident or a failure.

The output unit 18*d* is a processing unit which performs exit put control to the client terminal 30 using the power distribution system information 17. As an aspect, the output unit 18*d* selects an arbitrary facility ID designated by a predetermined facility ID (for example, the facility ID of the power distribution substation SS or an arbitrary facility ID designated from the client terminal 30) among the facility IDs contained in the current "branch" table 17*b* stored in the storage unit 13. Then, the output unit 18*d* sets a node ID closest to the power distribution substation SS among the combinations of the node IDs associated with the previously-selected facility IDs to a root of a hierarchical structure. Then, the output unit 18*d* assigns a low-level layer to the node as the number of nodes are increased from the root toward the facility ID of the load facility at the end terminal, and generates display data of a graph structure of the current system in which the facilities are disposed between the respective nodes from the root to the end terminal. Thereafter, the output unit 18d transmits the display data of the graph structure of the current system to the client terminal 30, and causes the client terminal 30 to display the graph structure of the current system. Further, the display data herein has been exemplified to be displayed in the client terminal 30, but it may be displayed in a display unit provided in the power distribution management apparatus 10.

Figure 11:
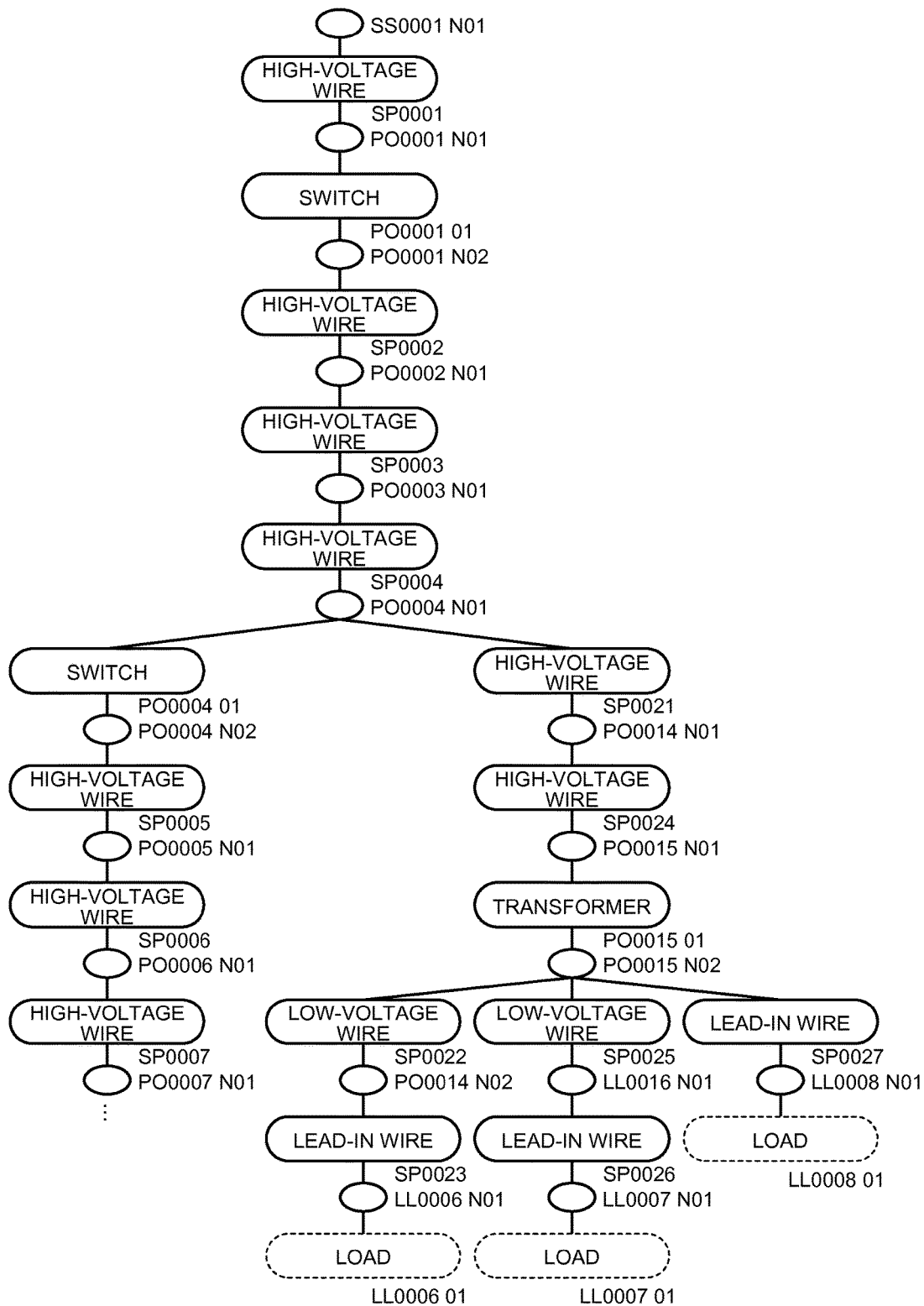
FIG. 11 is a diagram (1) illustrating an example of display data.
Figure 12:
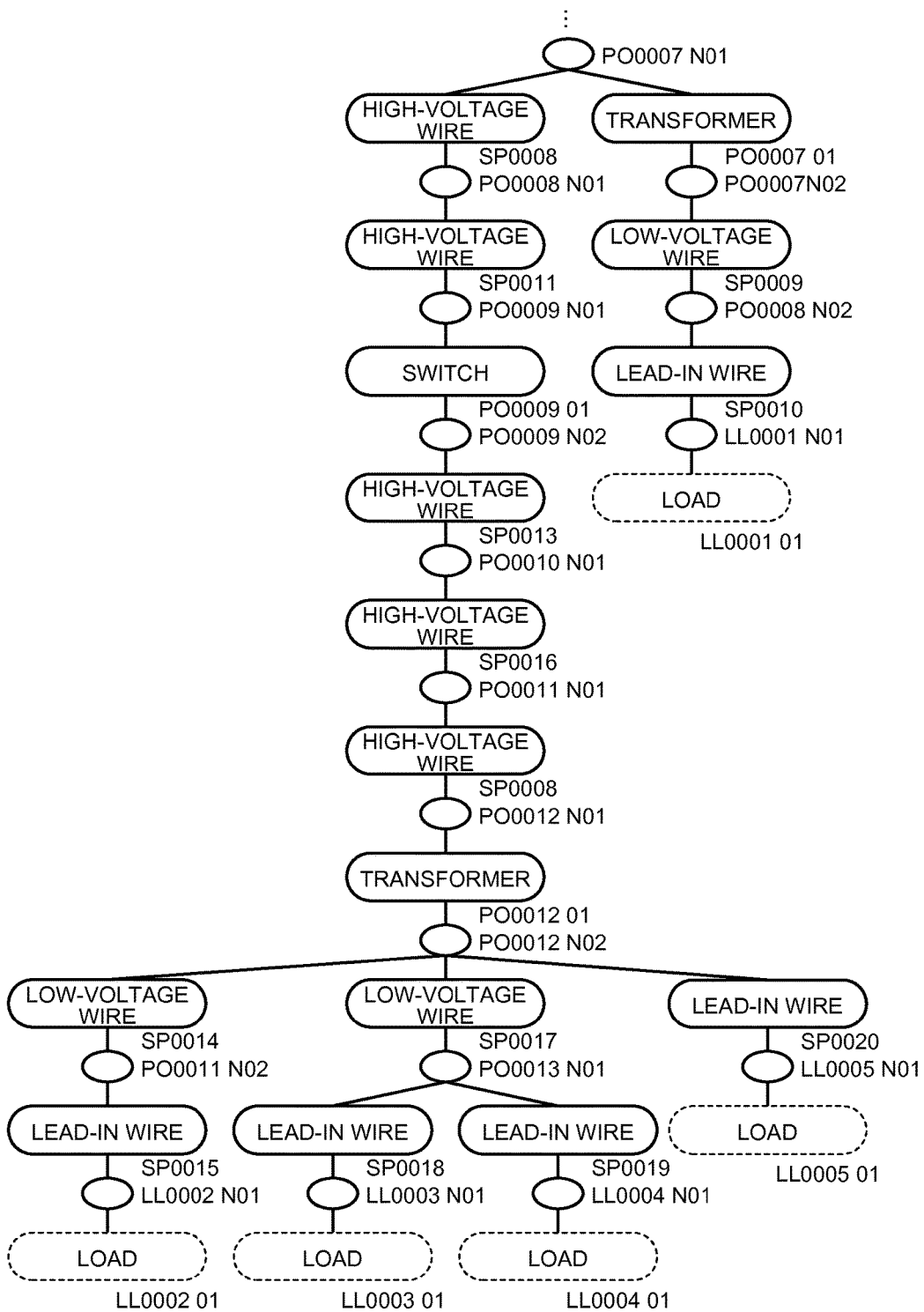
FIG. 12 is a diagram (2) illustrating an example of the display data.

FIGS. 11 and 12 are diagrams illustrating an example of the display data. FIGS. 11 and 12 illustrate the display data in a case where the current node table 17a illustrated in FIG. 9 and the current "branch" table 17b illustrated in FIG. 10 are expressed in the graph structure. In the display data illustrated in FIGS. 11 and 12, the node of the node ID "SS0001N01" is set to the root (layer 1) of the hierarchical structure. Furthermore, in the display data illustrated in FIGS. 11 and 12, routes from the root toward eight load facilities of the facility IDs "LL000101", "LL000201", "LL000301", "LL000401", "LL000501", "LL000601", "LL000701", and "LL000801" at the end terminals are illustrated. In the drawing, it can be seen that the layers from the SS bank to the load facility of the facility ID "LL000801" are the lowest as 10 layers, and the layers from the SS bank to the load facilities of the facility IDs "LL000201", "LL000301" and "LL000401" are the deepest as 19 layers. Furthermore, in the display data illustrated in FIGS. 11 and 12, the electrical connection in the power distribution system can be ascertained by subdividing the system in a unit of facility or a unit of junction between the facilities not in a rough unit such as the high-voltage system or the low-voltage system.

As another aspect, the output unit 18d may generate the display data on a map in which the facilities such as the "unit" and the "span" are disposed. For example, in a case where the facility contained in the current "branch" table 17b is a "unit", the output unit 18d acquires a position of the facility of the subject "unit" with reference to the position information 14 and the facility information 15. On the other hand, in a case where the facility contained in the current "branch" table 17b is a "span", the output unit 18d acquires positions of both ends of the subject "span". Furthermore, the output unit 18d may use the position of the "unit" and the positions of both ends of the "span" to output the display data which is disposed on the map where the "units" and "spans" are disposed.

Figure 13:
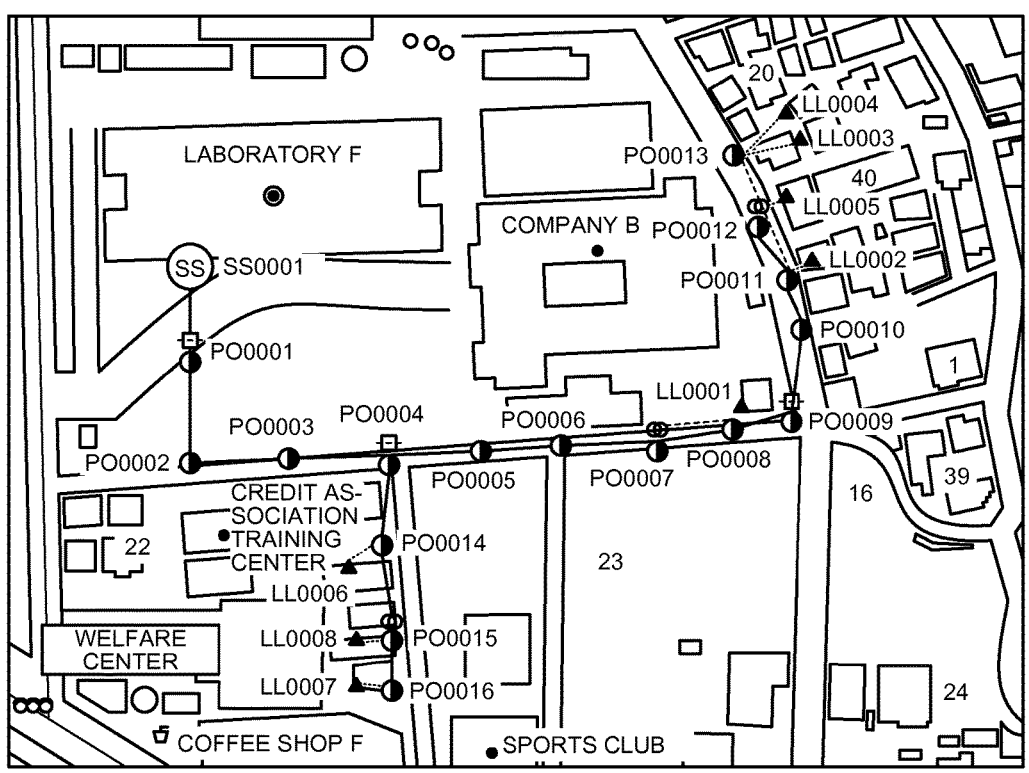
FIG. 13 is a diagram illustrating an example of the display data.

FIG. 13 is a diagram illustrating an example of the display data. In the display data illustrated in FIG. 13, similarly to the display data illustrated in FIGS. 11 and 12, it can be seen that the layers from the SS bank to the load facility of the facility ID "LL000801" are the lowest as 10 layers, and the layers from the SS bank to the load facilities of the facility IDs "LL000201", "LL000301" and "LL000401" are the deepest as 19 layers. As described above, in the display data illustrated in FIG. 13, similarly to the display data illustrated in FIGS. 11 and 12, the power distribution system can be ascertained by subdividing the system in a unit of facility or a unit of junction between the facilities not in a rough unit such as the high-voltage system or the low-voltage system. Furthermore, in the display data illustrated in FIG. 13, since the display positions of the "unit" and the "span" correspond to actual positions, it is possible to easily make a plan for maintenance or connection of the "unit" and the "span". In addition, since geographical elements (for example, an infrastructure such as roads and railways, and land marks besides the facilities of the power distribution system) on the map can be compared with the eye, it is useful even for a spot inspection.

As another aspect, the output unit 18d may generate the display data attached with the attribute information in the vicinity of the facility which is disposed in a graph structure or a map. For example, the output unit 18d may display the voltage ratio in the vicinity of the transformer, or may display resistance and reactance in the vicinity of the wire such as the high-voltage wire, the low-voltage wire, or the lead-in wire.

As still another aspect, the output unit 18d may calculate the voltage in each node using the attribute information (for example, the voltage ratio of the transformer, the resistance and reactance of the wire, or a history of the power consumption of each load facility stored in the storage unit 13) of the facility contained in the current "branch" table 17b. Furthermore, the output unit 18d may generate the display data attached with a voltage value of the current system to which the voltage value is added in the vicinity of the respective nodes disposed on the graph structure or the map.

Further, the controller 18 may employ various integrated circuits or electronic circuits. In addition, some of the functional units of the controller 18 may be configured by other integrated circuits or electronic circuits. For example, as the integrated circuit, an ASIC (Application Specific Integrated Circuit) may be used. In addition, as the electronic circuit, a CPU (Central Processing Unit) or an MPU (Micro Processing Unit) may be used.

[Flow of Processes]

Figure 14:
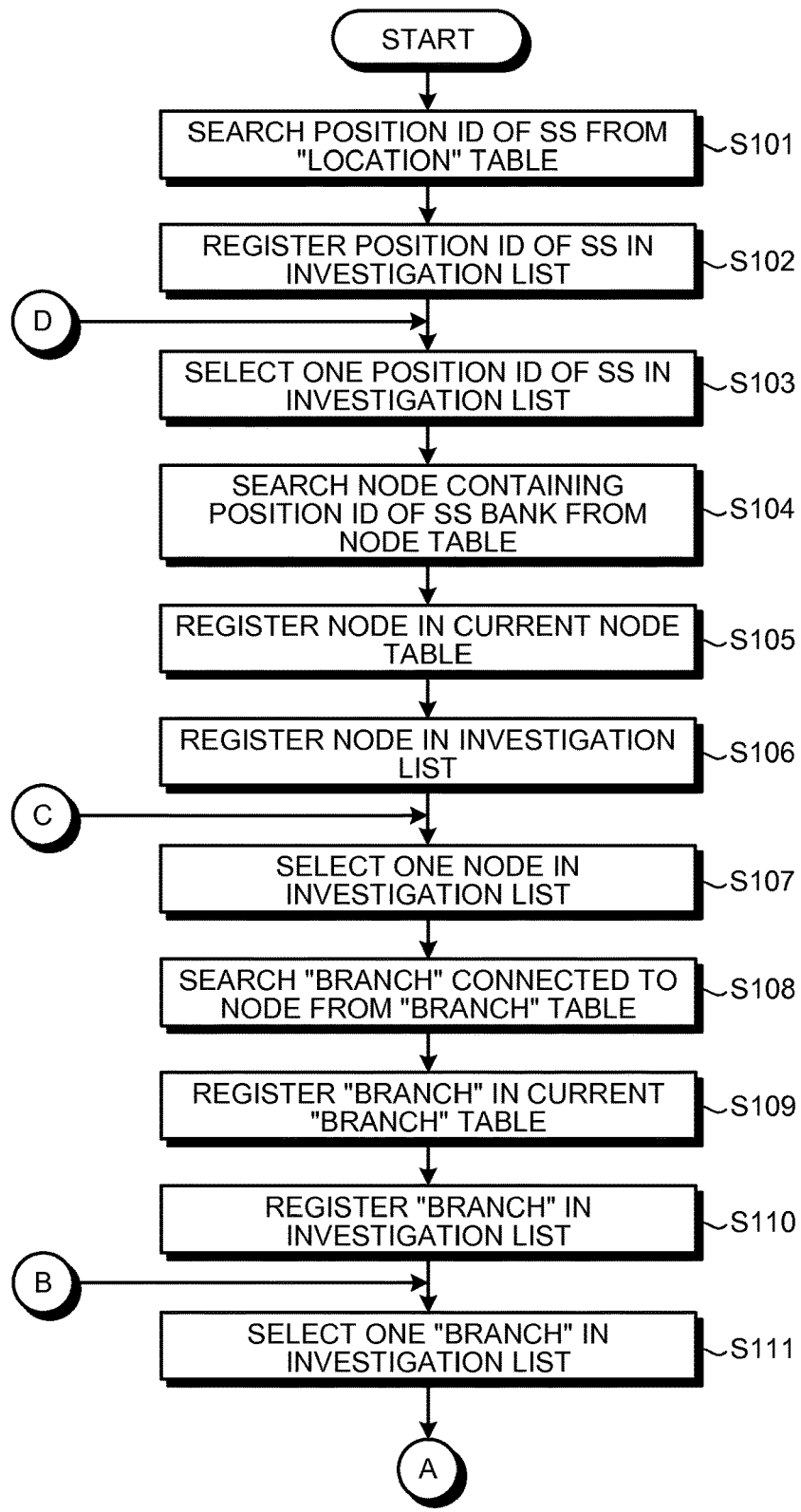
FIG. 14 is a flowchart (1) illustrating a power distribution management process according to the first embodiment.
Figure 15:
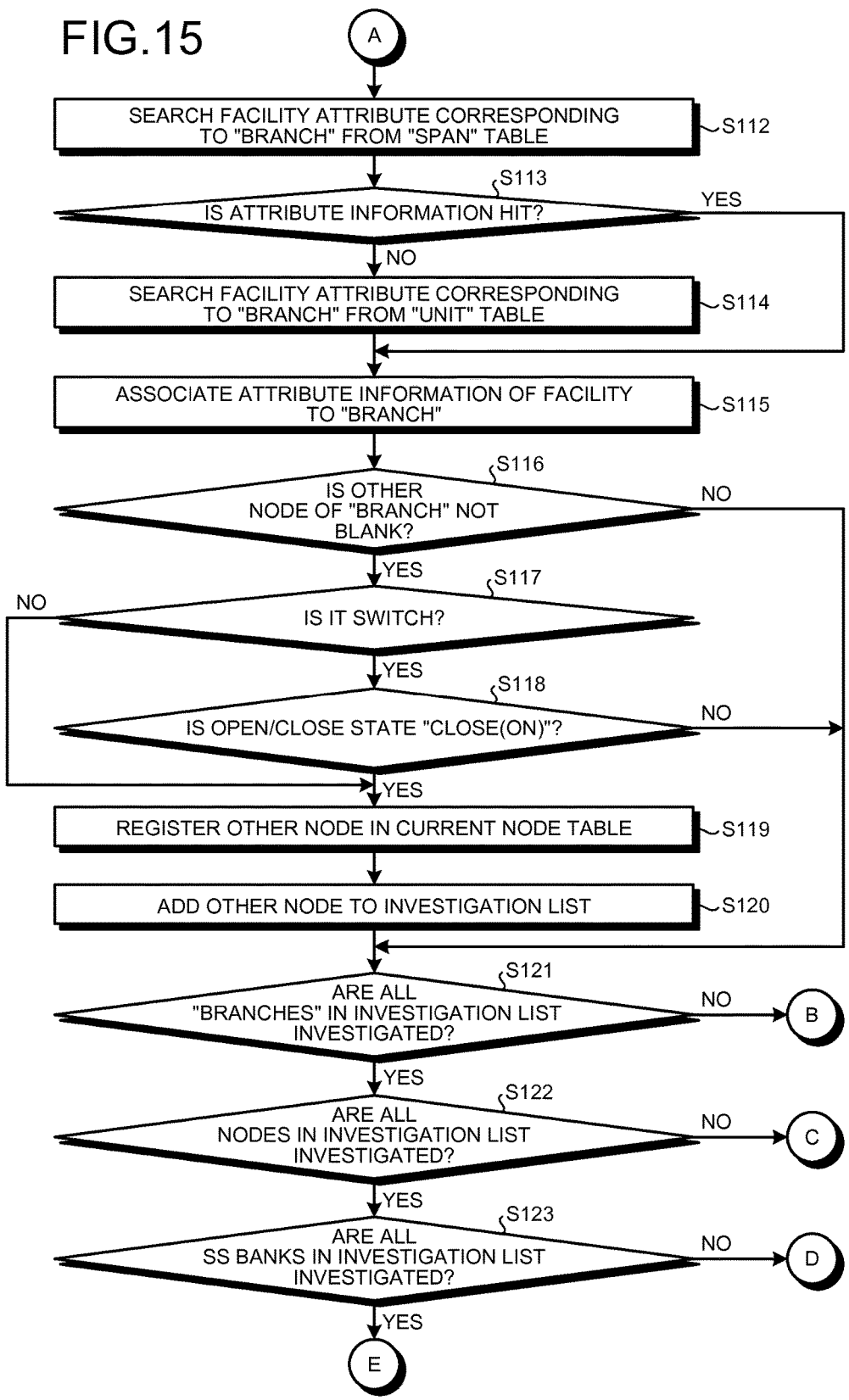
FIG. 15 is a flowchart (2) illustrating the power distribution management process according to the first embodiment.
Figure 16:
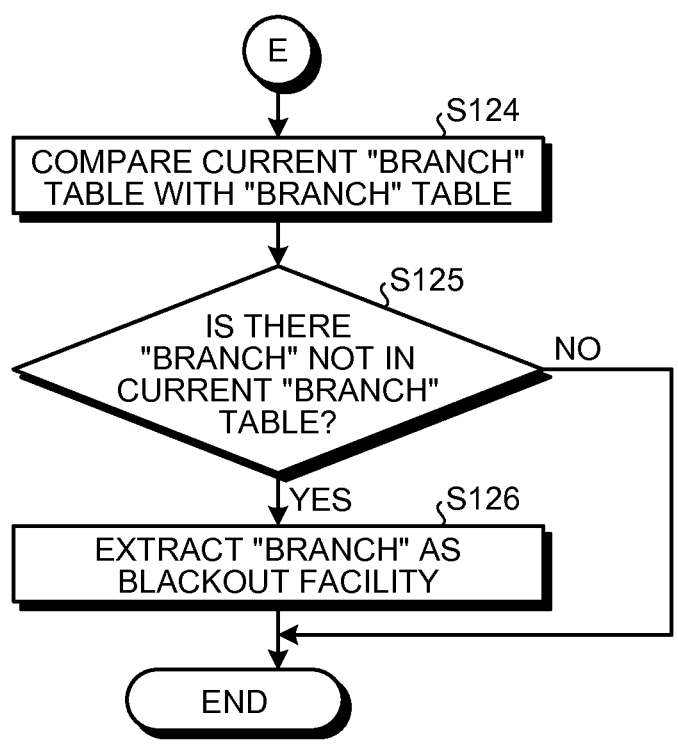
FIG. 16 is a flowchart (3) illustrating the power distribution management process according to the first embodiment.

Next, a flow of processes performed by the power distribution management apparatus according to the embodiment will be described. FIGS. 14 to 16 are flowcharts illustrating a power distribution management process according to the first embodiment. The power distribution management process starts in a case where the browse request of the power distribution system information is received through the client terminal 30, or in a case where a certain time period elapses after the last process.

As illustrated in FIG. 14, the search unit 18a searches the position ID of which the position type is the power distribution substation "SS" among the position IDs stored in the "location" table 14a (Step S101). Then, the search unit 18a registers the position ID of the power distribution substation SS searched from the "location" table 14a to the investigation list (Step S102).

Subsequently, the search unit 18a selects one position ID of the power distribution substation SS registered in the investigation list (Step S103). Then, the search unit 18a searches a node corresponding to the position ID of the power distribution substation SS to which the selection is previously performed among the nodes stored in the node table 16a (Step S104).

Furthermore, the search unit 18a registers the record of the node searched from the node table 15a in the current node table 17a which is stored as the power distribution system information 17 in the storage unit 13 (Step S105). Furthermore, the search unit 18a registers the node searched from the node table 16a in the investigation list (Step S106).

Then, the search unit 18a selects one node registered in the investigation list (Step S107). Subsequently, the search unit 18a searches the record of the "branch" having a combination of the node IDs containing the node selected in Step S107 (that is, a combination of the node $ID_1$ and the node $ID_2$) among the "branches" stored in the "branch" table 16b (Step S108).

Furthermore, the search unit 18a registers the record of the "branch" searched in Step S108 in the current "branch" table 17b (Step S109). Furthermore, the search unit 18a registers the "branch" searched in Step S108 in the investigation list (Step S110). Subsequently, the search unit 18a selects one "branch" registered in the investigation list (Step S111).

Then, as illustrated in FIG. 15, the search unit 18a searches the attribute information corresponding to the facility ID of the "branch" selected in Step S111 from the "span" table 15b (Step S112). At this time, in a case where the attribute information is not possible to be searched from the "span" table 15b (that is, a case where the attribute information it not hit) (No in Step S113), the search unit 18a performs the following process.

In other words, the search unit 18a searches the attribute information corresponding to the facility ID of the "branch" selected from the "unit" table 15a in Step S111 (Step S114). Further, in a case where the attribute information is possible to be searched from the "span" table 15b (Yes in Step S113), the procedure skips the process of Step S114 and moves to the process of Step S115.

Then, the association unit 18b registers the attribute information of the "branch" in association with the record of the subject "branch" used in the search of the "span" table 15b or the "unit" table 15a among the records stored in the current "branch" table 17b (Step S115).

Thereafter, the search unit 18a determines whether the other node paring with the node investigated in Step S108 among the combinations of the nodes containing the "branch" searched in Step S108 is a blank (Step S116).

At this time, in a case where the other node is not a blank (Yes in Step S116), the search unit 18a further determines whether the subject "branch" is a switch (Step S117). Then, in a case where the "branch" is a switch (Yes in Step S117), the search unit 18a further determines whether the switch is in the close state (that is, whether the switch is in the ON state) (Step S118).

Herein, in a case where the switch is the ON state (Yes in Step S118), the search unit 18a searches the record of the other node from the node table 16a and then registers the other node in the current node table 17a of the power distribution system information 17 (Step S119). Furthermore, the search unit 18a adds the other node to the investigation list as the uninvestigated node (Step S120).

In addition, even in a case where the "branch" is not a switch (No in Step S117), the search unit 18a searches the record of the other node from the node table 16a and than registers the other node in the current node table 17a of the power distribution system information 17 (Step S119). Furthermore, the search unit 18a adds the other node to the investigation list as the uninvestigated node (Step S120).

On the other hand, in a case where the other node is a blank or in a case where the switch is in the OFF state (No in Step S116 or No in Step S118), the procedure proceeds to the process of Step S121.

Thereafter, the search unit 18a determines whether all the "branches" registered in the investigation list, are investigated (Step S121). At this time, in a case where some of the "branches" registered in the investigation list are not investigated (No in Step S121), the uninvestigated "branch" is selected (Step S111) and then the processes from Step S112 to Step S121 are repeatedly performed.

Then, when all the "branches" registered in the investigation list are investigated (Yes in Step S121), the search unit 18a determines whether all the nodes registered in the investigation list are investigated (Step S122). At this time, in a case where some of the nodes registered in the investigation list are not investigated (No in Step S122), the uninvestigated node is selected (Step S107) and then the processes from Step S108 to Step S121 are repeatedly performed.

Thereafter, when all the nodes registered in the investigation list are investigated (Yes in Step S122), the search unit 18a determines whether all the position IDs of the power distribution substations SS registered in the investigation list are investigated (Step S123). At this time, in a case where some of the position IDs of the power distribution substations SS registered in the investigation list are not investigated (No in Step S123), the position ID of the uninvestigated power distribution substation SS is selected (Step S103) and then the processes from Step S104 to Step S122 are repeatedly performed.

Then, in a case where all the position IDs of the power distribution substations SS registered in the investigation list are investigated (Yes in Step S123), as illustrated in FIG. 16, the detection unit 18c compares the record of the "branch" stored in the "branch" table 16b and the record of the "branch" stored in the current "branch" table 17b (Step S124).

Herein, in a case where the "branch" table 16b includes a record of the "branch" not matched with the current "branch" table 17b (Yes in Step S125), the detection unit 18c detects the facility of the facility ID contained in the record of the subject "branch" as a blackout place (Step S126), and the process is ended. On the other hand, in a case where the "branch" table 16b has no record of the "branch" not matched with the current "branch" table 17b (No in Step S125), the process is ended without any action.

Configuration of First Embodiment

As described above, the power distribution management apparatus 10 according to the embodiment investigates the uninvestigated junction among the combinations of junctions to which the facilities of the power distribution system are electrically connected, and at the same time searches the facility determined from the combination of the uninvestigated junction and then outputs the connection information of the facility. Therefore, in the power distribution management apparatus 10 according to the embodiment, the electrical connection of the power distribution system can be ascertained in a unit of facility.

Second Embodiment

Hitherto, the embodiment of the disclosed apparatus has been described, but the invention may be implemented in various different forms other than the embodiment described above. In the following, another embodiment belonging to the invention will be described.

[Distribution and Integration]

In addition, the respective depicted components are not necessarily configured as physically illustrated in the drawings. In other words, a specific pattern of distribution and integration of the respective apparatuses is not limited to the pattern illustrated in the drawing, but some or all of them may be mechanically or physically distributed/integrated in an arbitrary unit according to various loads or usage conditions. For example, a search unit 18a, an association unit 18b, a detection unit 18c, or an output unit 18d may be provided as an external apparatus of a power distribution management apparatus 10 to be connected through a network. In addition, the search unit 18a, the association unit 18b, the detection unit 18c, or the output unit 18d may be provided in an individual apparatus, and the function of the power distribution management apparatus 10 may be realized by connecting these apparatuses through the network to operate in cooperation with each other.

[Power Distribution Management Program]

In addition, the various types of processes described in the above embodiment may be realized by executing a program prepared beforehand using a computer such as a personal computer or a workstation. In the following, using FIG. 17, an example of the computer which executes the power distribution management program having the same functions as the above embodiment will be described.

Figure 17:
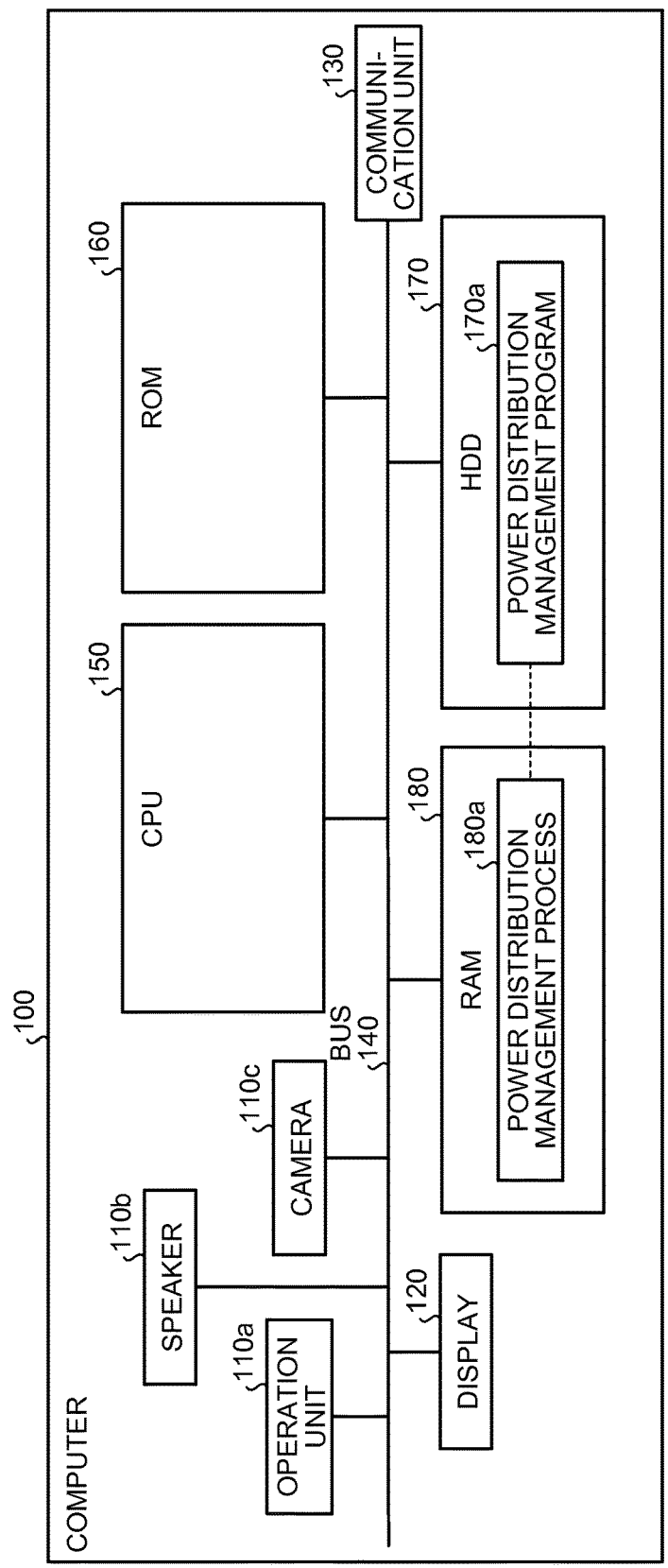
FIG. 17 is a diagram for describing an example of a computer which executes a power distribution management program according to the first embodiment and a second embodiment.

FIG. 17 is a diagram for describing an example of the computer which executes the power distribution management program according to the first embodiment and the second embodiment. As illustrated in FIG. 17, a computer 100 includes an operation unit 110a, a speaker 110b, a camera 110c, a display 120, and a communication unit 130. Furthermore, the computer 100 includes a CPU 150, ROM 160, an HDD 170, and RAM 180. These components 110 to 180 are connected to each other through a bus 140.

As illustrated in FIG. 17, a power distribution management program 170a which performs the same functions as the search unit 18a, the association unit 18b, the detection unit 18c, and the output unit 18d illustrated in the first embodiment is stored in the HDD 170 beforehand. The power distribution management program 170a may be appropriately integrated or divided similarly to the respective elements of the search unit 18a, the association unit 18b, the detection unit 18c, and the output unit 18d illustrated in FIG. 1. In other words, all the data to be stored in the HDD 170 is not necessarily stored in the HDD 170, and only data used for the process may be stored in the HDD 170.

Then, the CPU 150 reads the power distribution management program 170a out of the HDD 170 and develops the program in the RAM 180. Therefore, as illustrated in FIG. 17, the power distribution management program 170a functions as a power distribution management process 180a. The power distribution management process 180a develops various types of data read out of the HDD 170 in an area appropriately allocated for its own sake on the RAM 180, and performs various types of processes based on the various types of developed data. Further, the power distribution management process 180a includes the processes (for example, the processes illustrated in FIGS. 14 to 16) performed by the search unit 18a, the association unit 18b, the detection unit 18c, and the output unit 18d illustrated in FIG. 1. In addition, all the respective processing units virtually realized on the CPU 150 are always not necessarily operated on the CPU 150, and only the processing units used for the process may be virtually realized.

Further, the power distribution management program 170a is not always stored in the HDD 170 or the ROM 160 from the beginning. For example, the respective programs may be stored in a "portable physical medium" (what is called an FD, a CD-ROM, a DVD disk, a magneto-optical disk, an IC card, and the like) of a flexible disk inserted in the computer 100. Then, the computer 100 may acquire the respective programs from the portable physical mediums and execute the programs. In addition, the respective programs are stored in another computer or a server apparatus connected to the computer 100 through a public line, the Internet, a LAN, a WAN, and the like, and the computer 100 may acquire and execute these programs.

According to an aspect of an embodiment, it is possible to ascertain electrical connection of a power distribution system in a unit of facility.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power distribution management apparatus comprising:
    an electrical connection storage unit configured to store electrical connection information in which a combination of a plurality of junctions at which a plurality of facilities of a power distribution system are electrically connected to each other and a facility determined based on the combination are associated, the facility being one of the plurality of facilities, and the electrical connection storage unit storing the plurality of facilities and junction information that are associated with one another;
    a search unit configured to search a facility corresponding to the combination while investigating an uninvestigated junction among the plurality of junctions contained in the combination starting from a predetermined junction with reference to the electrical connection information stored in the electrical connection storage unit; and
    an output unit configured to output facility information obtained from the combination where the investigation is performed and a result of the search after the investigation and the search are performed so that the electrical connection in the power distribution system can be ascertained by subdividing the power distribution system in a unit of facility or a unit of junction between the facilities not in a rough unit of a high-voltage system or a low-voltage system, wherein
    the power distribution management apparatus includes:
    a facility storage unit configured to store facility information in which a facility of the power distribution system and attribute information of the facility are associated, the facility being one of the plurality of facilities;
    an association unit configured to associate a facility obtained from the combination where the investigation is performed and attribute information corresponding to the facility obtained from the combination where the investigation is performed which is obtained from the attribute information stored in the facility storage unit; and
    a position storage unit configured to store position information which indicates a position where a non-installation facility not provided by installation is provided,
    wherein a position of the non-installation facility among the positions contained in the position information is further associated with the non-installation facility among the facilities contained in the facility information,
    wherein positions of the non-installation facility corresponding to both ends of the installation facility among the positions contained in the position information are associated with an installation facility provided by installation among the facilities contained in the facility information, and wherein the output unit uses the position of the non-installation facility when the facility obtained as a result of the search is the non-installation facility with reference to the facility information, uses the positions of both ends of the installation facility when the facility obtained as a result of the search is the installation facility, and outputs display data in which the non-installation facility and the installation facility are arranged on a map, and in a case where the facility contained in a current branch table is a span, the output unit acquires positions of both ends of the span, and use the position of the unit and the positions of both ends of the span to output the display data which is disposed on the map where the units and spans are disposed.

2. The power distribution management apparatus according to claim 1, wherein when the facility determined from the combination is a switch, an open/close state of the switch is further associated with the electrical connection information, and wherein when the open state is associated with the combination under investigation, the search unit excludes an uninvestigated junction contained in the combination from an investigation target.

3. The power distribution management apparatus according to claim 1, wherein the search unit performs an investigation starting from one of the plurality of junctions corresponding to a power substation among the plurality of junctions.

4. The power distribution management apparatus according to claim 1, further comprising:

a detection unit configured to detect a blackout facility by comparing the combination and the facility contained in the electrical connection information with the facility obtained from the combination where the investigation is performed and the result of the search.

5. The power distribution management apparatus according to claim 1, wherein the electrical connection storage unit is configured to store connection information, the connection information being information in which a facility of a power distribution system is associated with a combination of a junction at a primary side of the facility and a junction at a secondary side of the facility, the search unit is configured to search the connection information for a facility corresponding to a combination containing a junction matching with a junction set as a search key for the connection information, a determination unit is configured to determine, when a facility searched by the search unit is a switch, whether the switch is in a close state, and the output unit is configured to output information of the searched facility, wherein when the searched facility is not the switch or when the switch is in the close state, the search unit allows a junction not used for the search unit among junctions contained in the combination associated with the searched facility to be set as the search key and repeats searching the connection information.

6. The power distribution management apparatus according to claim 1, wherein a parameter used for calculating a voltage is a connection phase to which a transformer is connected.

7. A power distribution management method which is executed by a computer, wherein the method causes the computer to perform with reference to electrical connection information in which a combination of a plurality of junctions at which a plurality of facilities of a power distribution system are electrically connected to each other and a facility determined based on the combination are associated, the facility being one of the plurality of facilities, and an electrical connection storage unit storing the plurality of facilities and junction information that are associated with one another, searching a facility corresponding to the combination while investigating an uninvestigated junction among the plurality of junctions contained in the combination starting from a predetermined junction, and outputting facility information obtained from the combination where the investigation is performed and a result of the search after the investigation and the search are performed so that the electrical connection in the power distribution system can be ascertained by subdividing the power distribution system in a unit of facility or a unit of junction between the facilities not in a rough unit of a high-voltage system or a low-voltage system, wherein the computer further performs a process of associating the facility obtained from the combination where the investigation is performed and the result of the search with attribute information corresponding to the facility obtained as the result of the search among the attribute information contained in facility information in which the facility of the power distribution system and the attribute information of the facility are associated, wherein a non-installation facility not provided installation among the facilities contained in the facility information is further associated with a position of the non-installation facility among positions contained in position information which indicates a position where the non-installation facility is provided, wherein positions of the non-installation facility corresponding to both ends of the installation facility among the positions contained in the position information are associated with an installation facility provided by installation among the facilities contained in the facility information, and wherein, as a process of outputting the combination and the facility, a process of using the position of the non-installation facility when the facility obtained as a result of the search is the non-installation facility with reference to the facility information, using the positions of both ends of the installation facility when the facility obtained as a result of the search is the installation facility, and outputting display data in which the non-installation facility and the installation facility are arranged on a map is performed, and in a case where the facility contained in a current branch table is a span, the outputting includes acquiring positions of both ends of the span, and using the position of the unit and the positions of both ends of the span to output the display data which is disposed on the map where the units and spans are disposed.

8. The power distribution management method according to claim 7,
wherein when the facility determined from the combination is a switch, an open/close state of the switch is further associated with the electrical connection information, and
wherein when the open state is associated with the combination under investigation, a process of excluding an uninvestigated junction contained in the combination from an investigation target is performed as a process of performing the investigation and the search.

9. A non-transitory computer-readable recording medium having stored therein a program for power distribution management for causing a computer to execute a process comprising:
with reference to electrical connection information in which a combination of a plurality of junctions at which a plurality of facilities of a power distribution system are electrically connected to each other and a facility determined based on the combination are associated, the facility being one of the plurality of facilities, and an electrical connection storage unit storing the plurality of facilities and junction information that are associated with one another, searching a facility corresponding to the combination while investigating an uninvestigated junction among the plurality of junctions contained in the combination starting from a predetermined junction; and
outputting facility information obtained from the combination where the investigation is performed and a result of the search after the investigation and the search are performed so that the electrical connection in the power distribution system can be ascertained by subdividing the power distribution system in a unit of facility or a unit of junction between the facilities not in a rough unit of a high-voltage system or a low-voltage system,
wherein the process further comprises
associating the facility obtained from the combination where the investigation is performed and the result of the search with attribute information corresponding to the facility obtained as the result of the search among the attribute information contained in facility information in which the facility of the power distribution system and the attribute information of the facility are associated,
wherein a non-installation facility not provided by installation among the facilities contained in the facility information is further associated with a position of the non-installation facility among positions contained in position information which indicates a position where the non-installation facility is provided,
wherein positions of the non-installation facility corresponding to both ends of the installation facility among the positions contained in the position information are associated with an installation facility provided by installation among the facilities contained in the facility information, and
wherein, as a process of outputting the combination and the facility,
a process of using the position of the non-installation facility when the facility obtained as a result of the search is the non-installation facility with reference to the facility information, using the positions of both ends of the installation facility when the facility obtained as a result of the search is an installation facility, and outputting display data in which the non-installation facility and the installation facility are arranged on a map is performed, and
in a case where the facility contained in a current branch table is a span, the outputting includes acquiring positions of both ends of the span, and using the position of the unit and the positions of both ends of the span to output the display data which is disposed on the map where the units and spans are disposed.

10. The non-transitory computer-readable recording medium according to claim 9,
wherein when the facility determined from the combination is a switch, an open/close state of the switch is further associated with the electrical connection information, and
wherein when the open state is associated with the combination under investigation, a process of excluding an uninvestigated junction contained in the combination from an investigation target is performed as a process of performing the investigation and the search.

* * * * *